US 7,685,296 B2

(12) United States Patent
Brill et al.

(10) Patent No.: US 7,685,296 B2
(45) Date of Patent: Mar. 23, 2010

(54) SYSTEMS AND METHODS FOR CLIENT-BASED WEB CRAWLING

(75) Inventors: Eric D. Brill, Redmond, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1739 days.

(21) Appl. No.: 10/670,681

(22) Filed: Sep. 25, 2003

(65) Prior Publication Data

US 2005/0071766 A1 Mar. 31, 2005

(51) Int. Cl.
*G06F 17/00* (2006.01)
*G06F 9/00* (2006.01)
(52) U.S. Cl. .............. 709/228; 709/245; 709/204; 709/217; 726/26; 707/3; 707/6; 707/10; 707/100; 707/204; 715/738
(58) Field of Classification Search .......... 709/228, 709/245, 204, 217–219, 223–225, 229
See application file for complete search history.

(56) References Cited

U.S. PATENT DOCUMENTS

| 5,935,210 | A |  | 8/1999 | Stark |
| 6,199,081 | B1 |  | 3/2001 | Meyerzon et al. |
| 6,547,829 | B1 |  | 4/2003 | Meyerzon et al. |
| 6,615,258 | B1 | * | 9/2003 | Barry et al. .................. 709/223 |
| 6,638,314 | B1 |  | 10/2003 | Meyerzon et al. |
| 2004/0034652 | A1 | * | 2/2004 | Hofmann et al. ............. 707/102 |
| 2004/0240388 | A1 | * | 12/2004 | Albion et al. ................ 370/252 |
| 2005/0027670 | A1 | * | 2/2005 | Petropoulos .................... 707/1 |
| 2006/0167864 | A1 | * | 7/2006 | Bailey et al. .................... 707/3 |

FOREIGN PATENT DOCUMENTS

| EP | 1 120 717 A | 8/2001 |
| RU | 2144270 C1 | 1/2000 |
| WO | WO 99/48028 A | 9/1999 |

OTHER PUBLICATIONS

Paolo Boldi, et al., Ubicrawler: A Scalable Fully Distributed Web Crawler, Proc. AusWeb02, The Eighth Australian World Wide Web Conference, 2002, pp. 1-9.
Vladislav Shkapenyuk, et al., Design and Implementation of a High-Performance Distributed Web Crawler, Proceedings of the 18th International Conference on Data Engineering, 2002, San Jose, CA.

(Continued)

*Primary Examiner*—Jude J Jean Gilles
(74) *Attorney, Agent, or Firm*—Lee & Hayes, PLLC

(57) ABSTRACT

The present invention provides systems and methods for obtaining information from a networked system utilizing a distributed web crawler. The distributed nature of clients of a server is leveraged to provide fast and accurate web crawling data. Information gathered by a server's web crawler is compared to data retrieved by clients of the server to update the crawler's data. In one instance of the present invention, data comparison is achieved by utilizing information disseminated via a search engine results page. In another instance of the present invention, data validation is accomplished by client dictionaries, emanating from a server, that summarize web crawler data. The present invention also facilitates data analysis by providing a means to resist spoofing of a web crawler to increase data accuracy.

104 Claims, 14 Drawing Sheets

OTHER PUBLICATIONS

Hongfei Yan, et al., A Dynamically Reconfigurable Model for a Distributed Web Crawling System, Dept. of Computer Science and Technology, Peking University, P.R. China, Proceedings of the ICCNMC'01, 2001.

Sherman C, Help LookSmart Crawl The Web, Search Engine Watch, "Online!", Apr. 3, 2003, pp. 1-4, p. 1, last paragraph—p. 2.

Hongfei Yan, et al, Architectural Design And Evaluation Of An Efficient Web-Crawling System, Parallel And Distributed Processing Symposium, Proceedings 15th International San Fransisco, CA, USA, Apr. 2001, Los Alamitos, CA, USA, IEEE Comput. Soc, US. Apr. 23, 2001, pp. 1824-1831, p. 1826, right-hand column, last paragraph—p. 1828, right-hand column.

Yamana H. et al, Experiments of Collecting WWW Information Using Distributed WWW Robots, Proceedings Of The Annual International ACM SIGIR Conference On Research And Development In Information Retrieval, XX, XX, 1998, pp. 379-380, p. 379, right-hand column—p. 380, left-hand column.

Takano H. et at., Development Of A Scalable Web Crawler, NEC Research And Development, NIPPON Electric Ltd, Tokyo, Japan, vol. 40, No. 3, Jul. 1999, pp. 334-339. p. 336. left-hand column—p. 337, left-hand column.

Bowman C. M., et al, The Harvest Information Discovery And Access System, Computer Networks And ISDN Systems, North Holland Publishing, Amsterdam, NL, vol. 28, No. 1. Dec. 1, 1995, pp. 119-125.

European Search Report, EP 04 02 0165, mailed Dec. 3, 2004.

European Search Report, EP 04 02 0165, mailed Mar. 2, 2005.

A. Singh, et al; "Apoidea:A Decentralized Peer-to Peer Architecture for Crawling the World Wide Web", SIGIR 2003: Workshop on Distributed Information Retrieval, (Lecture Notes in Artificial Intelligence), Aug. 1, 2003, pp. 126-142, vol. 2924, Springer-Verlag Berlin, Germany.

C. Sherman; "Help LookSmart Crawl the Web", Search Engine Watch, http://searchenginewatch.com/searchday/articie.php/2177021, Apr. 1, 2003, pp. 1-4.

S. Iyer; "Squirrel: A Decentralized Peer-to-Peer Web Cache", Proceedings of the 21st ACM Symposium on Principles of Distributed Computing, http://doi.acm.org/10.1145/571825.571861, Jul. 21-24, 2002, pp. 213-222, Monterey, California, USA.

Bowman C M et. al., "The Harvest information discovery and access system", Computer Networks and ISDN Systems, North Holland Publishing. Amsterdam, NL , vol. 28, No. 1, Dec. 1, 1995, pp. 119-125.

Hongfei, Y., et al., "Architectural design and evaluation of an efficient web-crawling system ", Parallel and Distributed Processing Symposium., Proceedings 15th Inter national San Francisco, CA, USA Apr. 23-27, 2001, Los Alamitos, CA, USA, IEEE Comput. Soc, US, Apr. 23, 2001, pp. 1824-1831.

Iyer S., et al., "Squirrel: A decentralized peer-to-peer web cache" Proceedings of the 21st ACM Symposium on Principles of Distributed Computing, PODC 2002, [Online], Jul. 24, 2002 pp. 213-222, Jul. 21-24, 2004, Monterey, California, USA, Retrieved from the internet <URL:http://doi.acm/10.1145/571825.571861> on Feb. 14, 2005.

Sherman, C., "Help LookSmart Crawl the Web", Search Engine Watch, [Online] , 3 Apro; 2003 (Apr. 3, 2003), pp. 1-4, retreived from the internet: <URL:http://searchenginewatch.com/searchday/article.php/2177021> on Oct. 27, 2004.

Singh, A., et al., "Apoidea: a decentralized peer-to-peer architecture for crawling the World Wide Web", Distributed Multimedia Information Retrieval, Sigir 2003 Workshop on Distributed Information Retrieval, Revised Selected and Invited Papers (Lecture Notes in Artificial Intelligence vol. 2924), Springer-Verlag Berlin, Germany, Aug. 1, 2003, pp.126-142.

Yamana, H. et al., "Experiments if collecting WWW information using distributed WWW robots" Proceedings of the Annual International ACM SIGIR Conference on Research and Development in Information Retrieval, XX, XX, 1998, pp. 379-380.

Takano H et al: "Development of a Scalable Web Crawler" NEC Research and Development, Nippon Electric Ltd. Tokyo, JO, vol. 40, No. 3, Jul. 1999 (Jul. 1999), pp. 334-339, XP000908388 ISSN: 0547-051X.

* cited by examiner

SYSTEMS AND METHODS FOR CLIENT-BASED WEB CRAWLING

TECHNICAL FIELD

The present invention relates generally to data analysis, and more particularly to systems and methods for obtaining information from a networked system utilizing a distributed web crawler.

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., com, org, net, gov and edu) that identifies the type of organization.

In some instances, the user knows, a priori, the name of the site or server, and/or the URL to the site or server that the user desires to access. In such situations, the user can access the site, as described above, via entering the URL in the address bar and connecting to the site. However, in most instances, the user does not know the URL or the site name. Instead, the user employs a search engine to facilitate locating a site based on keywords provided by the user. In general, the search engine is comprised of executable applications or programs that search the contents of web sites and servers for keywords, and return a list of links to web sites and servers where the keywords are found. Basically, the search engine incorporates a web "crawler" (aka, a "spider" or a "robot") that retrieves as many documents as possible as their associated URL. This information is then stored such that an indexer can manipulate the retrieved data. The indexer reads the documents, and creates a prioritized index based on the keywords contained in each document and other attributes of the document. Respective search engines generally employ a proprietary algorithm to create indices such that meaningful results are returned for a query.

Thus, a web crawler is crucial to the operation of search engines. In order to provide current and up-to-date search results, the crawler must constantly search the web to find new web pages, to update old web page information, and to remove deleted pages. The number of web pages found on the Internet is astronomical. It therefore requires that a web crawler be extremely fast. Since most web crawlers gather their data by polling servers that provide the web pages, a crawler must also be as unobtrusive as possible when accessing a particular server. Otherwise, the crawler can absorb all of the server's resources very quickly and cause the server to shut down. Generally, a crawler identifies itself to a server and seeks permission before accessing a server's web pages. At this point, a server can deny access to an abusive crawler that steals all of the server's resources. A web page hosting server typically benefits from search engines, because they allow users to find their web pages more easily. Thus, most servers welcome crawlers, as long as they do not drain all of the server's resources, so that the server's contents can be better exploited by users.

One of the downsides to a crawler identifying itself to a server is that the server can then "spoof" the crawler. Servers usually have protected areas that they do not want to have exposed to the general Internet. When a crawler identifies itself, it is also told what areas it cannot access. If the crawler wants to maintain a working relationship with that particular server, it abides by the server's requests. However, if a server desires to spoof or disguise its true contents, it can refer the crawler to an area of pages that mimic true URLs of that server but that contain "alternate" contents. Thus, a server that normally provides information only about cats can set up its URLs with information about dogs in a section that only web crawlers access. This is done so that when a user searches for "dogs," the server's web pages about cats will be shown by the search engine. Typically, spoofing is utilized when a server's content is deemed objectionable by society, but the server desires to proliferate its contents beyond its normal "keywords." In this manner, objectionable material can be returned in a search engine list by using common words such as flowers, dogs, cats, weather, etc. Spoofing diminishes the accuracy and also the reputation of search engines utilizing the spoofed web crawler data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data analysis, and more particularly to systems and methods for obtaining information from a networked system utilizing a distributed web crawler. The distributed nature of clients of a server is leveraged to provide fast and accurate web crawling data. Information gathered by a server's web crawler is compared to data retrieved by clients of the server to update the crawler's data. In one instance of the present invention, data comparison is achieved by utilizing information disseminated via a search engine results page. In another instance of the present invention, data validation is accomplished by client dictionaries, emanating from a server, that summarize web crawler data. In one aspect of the present invention, a "weak indicator" function from a set of weak indicator functions is randomly sent to clients. These weak indicator functions are significantly smaller than a total listing of all URLs found by a server's web crawler, thus, tremendously reducing server-client communication traffic. This facilitates in simplifying server-client interfaces while maintaining optimum accuracy of a web crawler's data.

The present invention also facilitates data analysis by providing a means to resist spoofing of a web crawler to increase data accuracy. A server that employs the present invention can resist spoofing by comparing its web crawler data to data provided by a client. This allows the server to eliminate spoofed data from its search engine, permitting a higher quality of search engine results. This capability facilitates in filtering out objectionable material that is not normally returned during an innocuous search, providing a more user-friendly experience for clients of the search engine.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
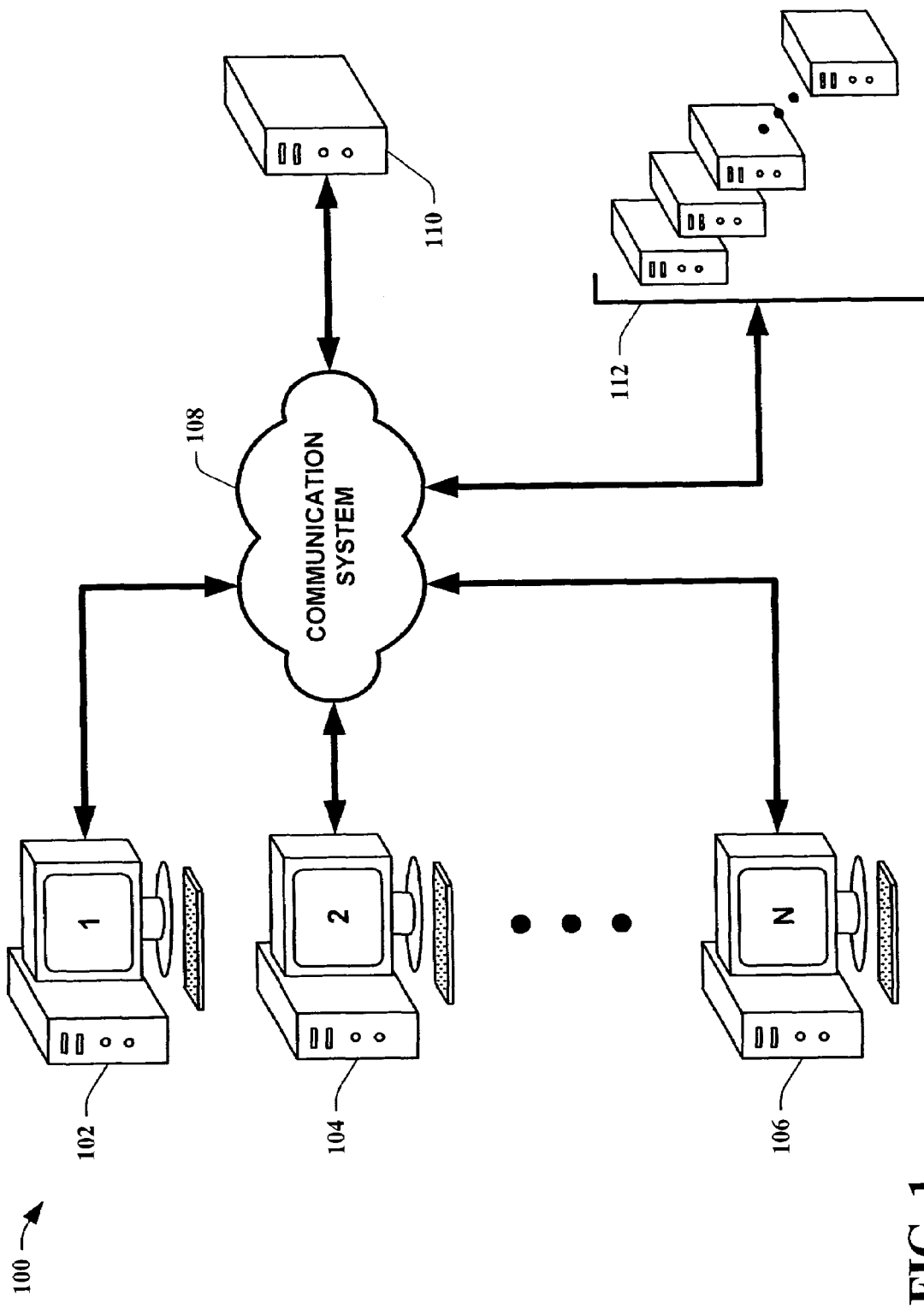
FIG. 1 is a block diagram of a data analysis system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides improved systems and methods of maintaining an index of web documents. It can also be utilized to retrieve and maintain data for other types of information. Traditional web crawlers have certain shortcomings which are alleviated by the present invention. Each client (e.g., a machine of any person who accesses the Web) stores local information, so it can learn whether a web page has changed since the last time the client visited it. If it has changed, the client can then communicate this information to the search engine. Likewise, a server can use information about web pages visited by clients to find pages currently unknown to the server. Effectively finding documents and maintaining current knowledge about those documents is an extremely important task for both intranet and internet search. The present invention can also be utilized in contexts such as intranet searches, where crawling pages and keeping page information fresh on a server is an even greater challenge.

An important component of a search engine (for the Internet, an intranet, or otherwise) is a data or document crawler. The document crawler performs two primary tasks: finding unknown documents to be indexed by the search engine and trying to ensure it has up-to-date knowledge about each known document. Both of these tasks are difficult and (along with page rank quality) are among the most important and visible quality differentiators among search engines. Document crawlers are typically based on a server model. A search engine crawls the Web by topological search. Beginning with a seed set of known web pages, the crawler follows links from those pages and can thereby find all web pages that are connected via a path (set of URL references) from the seed set. To ensure the search engine has up-to-date knowledge of a document collection, the crawl has to be repeated frequently. Since the crawler revisits web pages each time it crawls, it can learn how frequently a page (or subgraph) changes, and recrawl certain pages more frequently than others based on their past frequency of change.

There are a number of weaknesses with the current server-based crawling paradigm. First, a crawler can only find pages that can be reached by following links starting with one of the seed documents. Recent studies have shown that a large percentage of web pages are not currently indexed by any search engine. Second, the search engine can only learn about a change to a document (e.g., a content change, or a page that no longer exists) when the crawler happens to revisit the page.

The present invention offers systems and methods for effectively finding documents (e.g., data) and maintaining up-to-date knowledge about known documents in a way that remedies the above mentioned weaknesses. This is accomplished via a distributed client-based crawl. Each client (e.g., a machine of any person who accesses the Web) stores local information, so it can learn whether a page has changed since the last time the client visited it. If it has changed, the client can then communicate this information to the search engine. Likewise, the server can use information about the web pages visited by the clients to find pages currently unknown to the server.

In FIG. 1, a block diagram of a data analysis system 100 in accordance with an aspect of the present invention is illustrated. In this instance of the present invention, the data analysis system 100 is comprised of clients 102-106 numbered from 1 to "N," where N represents any number from 1 to infinity; a communication system 108, a search server 110, and web page servers 112. The clients 102-106 comprise a group of "distributed resources" for web page information for the search server 110. They generally function to provide new URLs and web page changes and the like to the search server 110 via the communication system 108. The communication system 108 is comprised of an internet and/or an intranet and the like. It provides a means of access for communication purposes between the search server 110 and the clients 102-106. It also enables communications between the clients 102-106 and other web page servers 112 and/or the search server 110 and other servers for gathering web page information. In essence, web crawler functionality is distributed among the search server 110 and the clients 102-106 instead of only functioning in a search server. The search server 110 utilizes the clients 102-106 to obtain information from web page servers 112 to facilitate in refining its own information. By distributing this functionality, the present invention provides a more up-to-date, robust, and spoof-proof data set from which a search engine can utilize data.

Figure 2:
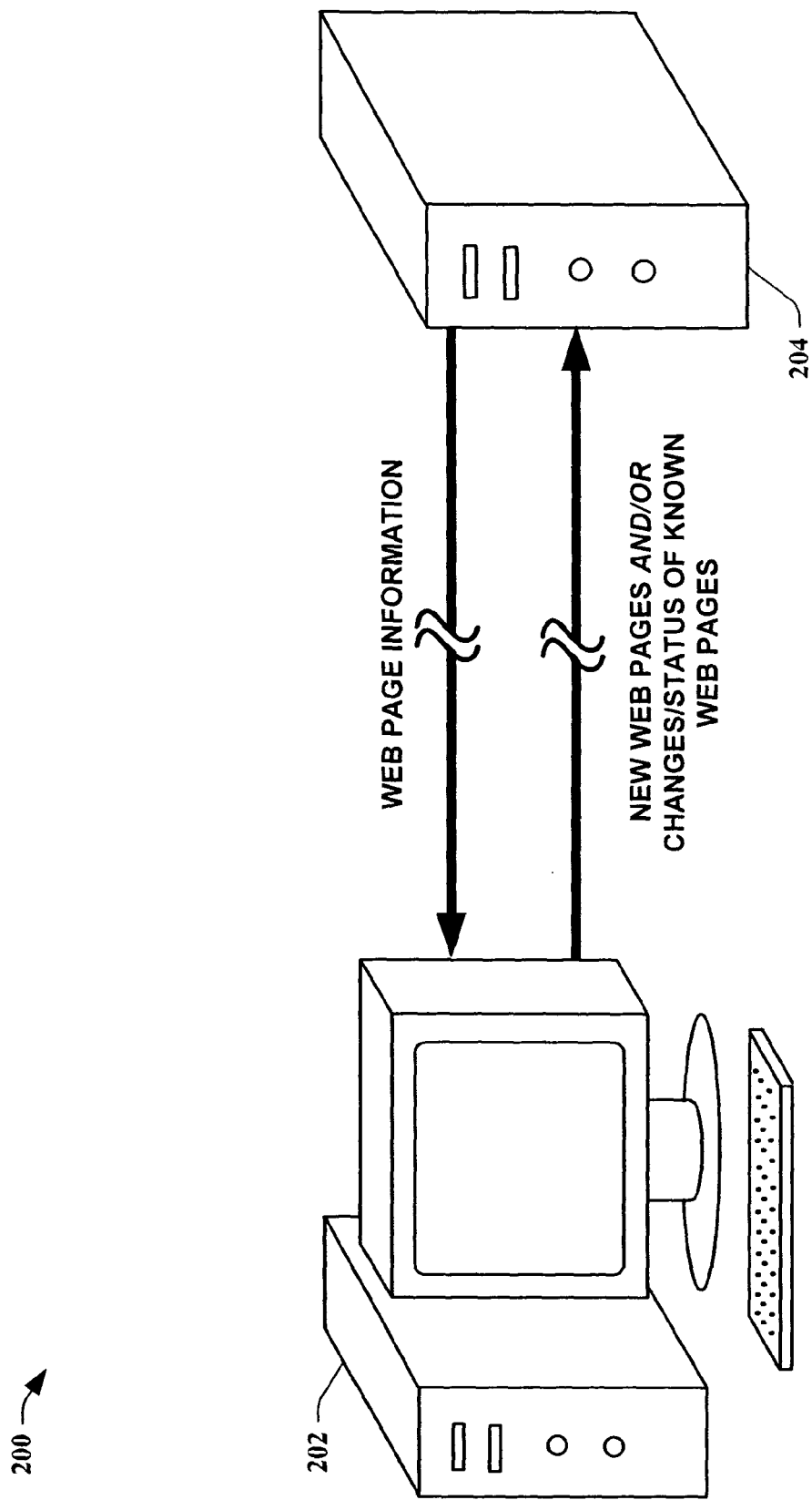
FIG. 2 is another block diagram of a data analysis system in accordance with an aspect of the present invention.

Turning to FIG. 2, another block diagram of a data analysis system 200 in accordance with an aspect of the present invention is shown. The data analysis system 200 is comprised of a client 202 and a server 204 with a communication means interoperative between them. During typical operation, the server 204 hosts a web crawler that searches a communication network such as the Internet for other servers hosting web pages. The crawler compiles a source of information about these web pages for utilization with a web page search engine. The server 204 then sends a representation of this web page information to the client 202. This provides the client 202 with the capability to independently verify web page information when it accesses a server hosting that particular web page. The client 202 can also detect web pages that are unknown to the server 204. This allows the client 202 to compile changes/status and/or new information about known and unknown web pages. This information is then transmitted to the server 204. The server 204 utilizes the information to refine its original crawler web page data. By having distributed resources, the server 204 expands its crawler capabilities without burdening its own immediate resources (e.g., processor utilization, storage space, etc.). Additionally, because a web crawler typically identifies itself to each server it accesses, it risks being redirected to false data on that server. Servers also may limit the amount of access and time that a web crawler can impose on the server's resources. A client accessing a server typically does not have these restrictions and is not redirected to false data. Thus, a client's web page data can be utilized to correct false data compiled by a web crawler. This aspect of the present invention is described in more detail infra.

Figure 3:
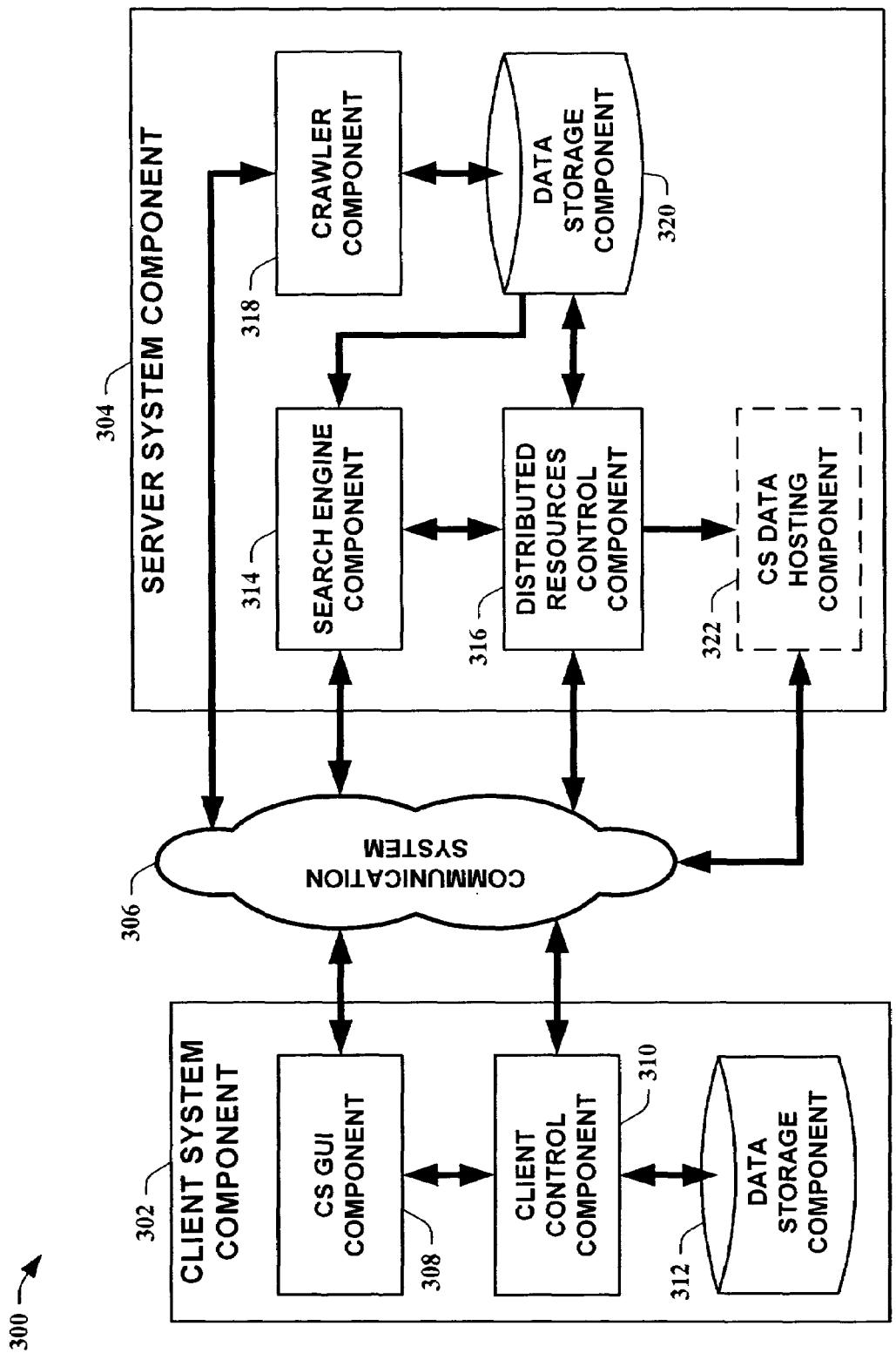
FIG. 3 is yet another block diagram of a data analysis system in accordance with an aspect of the present invention.

Referring to FIG. 3, yet another block diagram of a data analysis system 300 in accordance with an aspect of the present invention is depicted. The data analysis system 300 is comprised of a client system component 302 and a server system component 304 with a communication system (CS) 306 interoperative between them. In this instance of the present invention, the client system component 302 is comprised of a CS interface component 308, a client control component 310, and a data storage component 312. The CS graphical user interface (GUI) component 308 provides a user with an interface that is typically specific to a type of communication system employed. One example of such an interface is a web browser utilized to graphically relay information on at least the World Wide Web. A web browser can also be utilized to "surf" an intranet such as web pages served within a single corporation. In other instances of the present invention, similar information can be relayed utilizing a text based interface and the like rather than a graphical user interface. Typically, it is this component 308 that permits a user to run search queries on a search engine residing on a remote server connected to the communication system 306. Thus, the CS GUI component 308 transmits and/or receives information from the communication system 306. The client control component 310 provides control of a client with regard to facilitating web crawling. The client control component 310 receives and/or transmits data relating to information such as web pages and the like. It 310 processes algorithms, tracks data changes and status, and/or controls local data storage for a client in the data analysis system 300. It 310 can also analyze information from the CS GUI component 308 with information received from a web crawler to determine differences and the like. The client control component 310 allows a client to participate as a "distributed resource" for a web crawler and the like. It 310 can also access stored data and provide information to the CS GUI component 308. In one instance of the present invention, the CS GUI component 308 transmits and/or receives embedded crawler data. Thus, the client control component 310 interfaces with the GUI component 308 to receive and/or transmit embedded crawler related data in this manner. Likewise, it 310 can also send and/or receive controls from a server in the same manner. In another instance of the present invention, the client control component 310 can behave similar to a server and provide control in a peer-to-peer fashion to other clients. One skilled in the art will recognize that functionality of the client control component 310 and the CS GUI component can be combined in a single component. It is also possible to utilize a client as a distributed resource without having a CS GUI component 308. An example of this instance of the present invention would include, but is not limited to, a client relaying and/or controlling another client. The data storage component 312 is utilized to store, for example, crawler data from a server, crawler data from a client, web page changes, new web page data, and client control parameters and the like. It 312 can interface directly with the client control component 310 and/or the CS GUI component 308 depending on the instance of the present invention employed. The data storage component 312 can also be a data storage device such as a hard drive, random access memory, read only memory, removable media, and CD-ROMs and the like. In yet another instance of the present invention, information stored on the data storage component 312 can be directly accessed by a server without interfacing with the CS GUI component 308 or the client control component 310. In some instances, this permits faster data retrieval.

In one instance of the present invention, the communication system 306 is an internet such as "the Internet." It 306 can also be an intranet system such as a wide area network (WAN) and/or a local area network (LAN) and the like. The communication system 306 can also utilize more traditional communication means such as, for example, telephone systems, radio systems, light signal (optic) systems, and sound systems and the like. One skilled in the art will recognize that other global and local network structures can also be utilized by the present invention as the communication system 306.

The server system component 304 is comprised of a search engine component 314, a distributed resources control component 316, a crawler component 318, a data storage component 320, and an optional CS data hosting component 322. In one instance of the present invention, the crawler component 318 utilizes the communication system 306 to access servers and/or proxy servers to obtain web page related information such as web page content, age, size, URL, and embedded links and the like. This information is then stored in the data storage component 320. The data storage component 320 can be a data storage device such as a hard drive, random access memory, read only memory, removable media, and CD-ROMs and the like. The search engine component 314 provides a search capability for all web pages revealed by the web crawler 318 and stored in the data storage component 320. It 314 receives a search request/query from a user and accesses the information on the data storage component 320 to compile a list of links and web page data to send to the user. Thus, in a typical system, the search component 314 can only rely on the information obtained by the crawler component 318. However, in instances of the present invention, the distributed resources controller 316 facilitates compilation of the information stored in the data storage component 320, permitting it to be more robust, up-to-date, and more encompassing. The distributed resources control component 316 provides control over distributed resources such as, for example, clients of a server that interact as a single distributed crawler or "client-based web crawler." The component 316 provides, for example, such functionality as analysis of data received from distributed resources such as the client system component 302 and the like, determination of function and data allocations and their timing, provide algorithms to the distributed resources to determine known crawler data, receive data updates and/or additions, store data updates and/or additions in the data storage component 320, determination of an optimized utilization of the distributed resources, provide page data to the search engine component 314 to allow data embedding in search result pages for a particular search query, provide page data to an internet service provider to generate pages that include embedded page link information, and track data characteristics such as counts, types, spoof percentage, and source and the like. In another instance of the present invention, the search page component 314 sends and/or receives information for the distributed resources control component 316 rather than the component 316 directly accessing the communication system 306.

In an instance of the present invention, the optional CS data hosting component 322 interfaces with both the communication system 306 and the distributed resources control component 316. The CS data hosting component 322 provides a web page hosting capability to provide users with access to a web page. Because the CS data hosting component 322 is interactive with the distributed resources control component 316, it can receive and embed web page link information directly in its hosted web page. In other instances of the present invention, the CS data hosting component 322 interfaces directly with the data storage component 320 to access information for embedding in a web page. In yet another instance of the present invention, the CS data hosting component 322 interfaces with the search engine component 314 to access information for embedding in its web page links. In still yet another instance of the present invention, the CS data hosting component 322 can reside in a distributed resource such as a client. It 322 can also reside in another server that has access to the server system component 304. In this instance, the client (or a server) would in effect become a server for hosted web pages and supply information for embedding in web page links from its local storage and/or other local means.

One skilled in the art will appreciate that although each component is described independently, a component in other instances of the present invention can include functionality associated with other components. Likewise, some components can be eliminated without altering the scope of the present invention.

Figure 4:
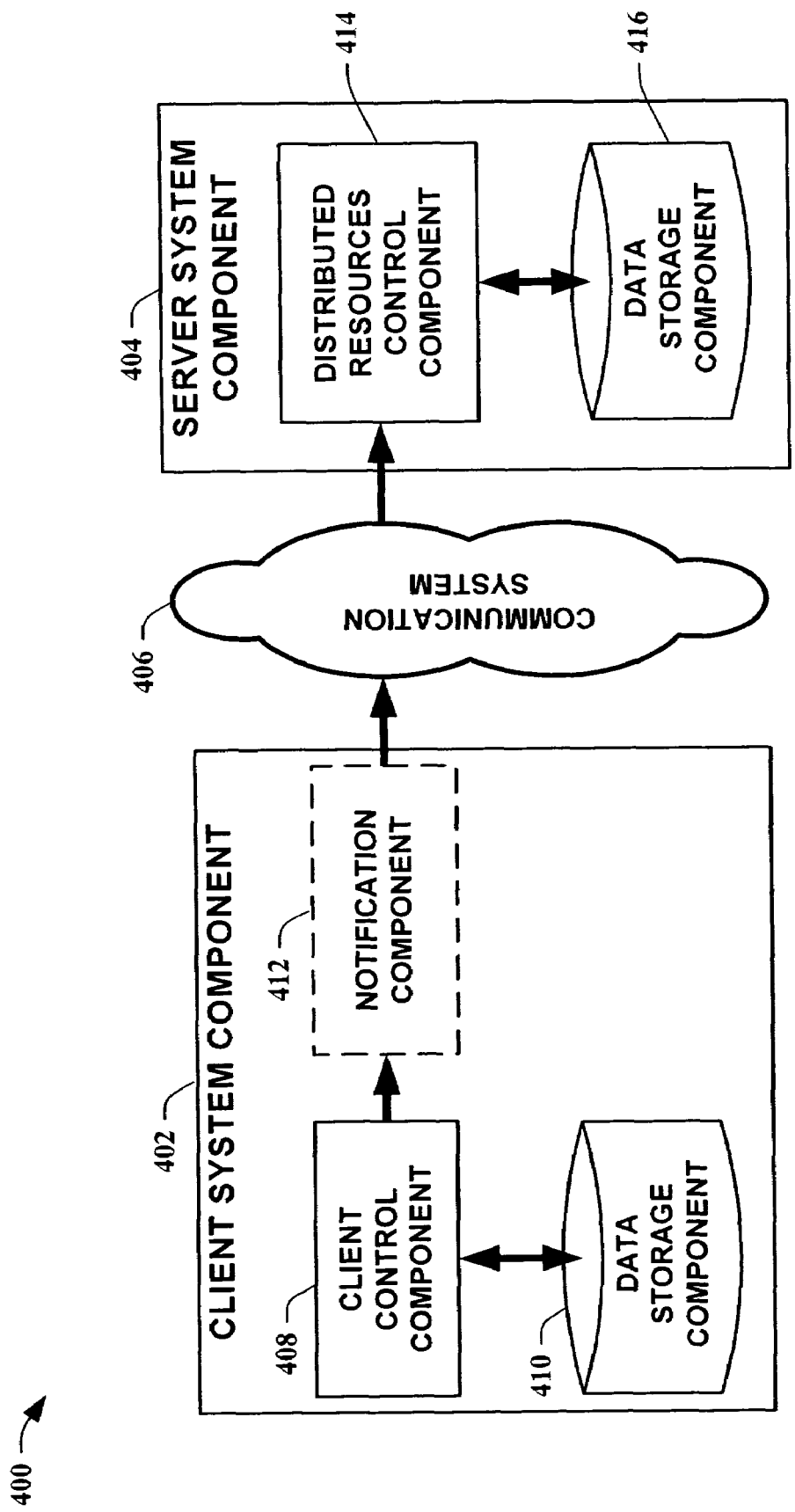
FIG. 4 is still yet another block diagram of a data analysis system in accordance with an aspect of the present invention.

Moving on to FIG. 4, still yet another block diagram of a data analysis system 400 in accordance with an aspect of the present invention is illustrated. The data analysis system 400 is comprised of a client system component 402 and a server system component 404 with a communication system 406 interoperative between them. In this instance of the present invention, the server system component 404 is comprised of a distributed resources control component 414 and a data storage component 416. The server system component 404 is abbreviated in order to emphasize an instance of the present invention with regard to reception of web page information from the client system component 402. Typically, information flows into and out of the distributed resources control component 414 via the communication system 406. The client system component 402 is comprised of a client control component 408, a data storage component 410, and an optional notification component 412. In this instance of the present invention, the notification component 412 controls data that flows from the client system component 402 to the server system component 404. In other instances of the present invention, it 412 also controls peer-to-peer communications between the client system component 402 and other client system components. Specifically, the notification component 412 determines when and/or what data is to be transmitted from the client system component 402. A determination can be based on size of accumulated web page data, whether links have been found which are unknown to the server system component 404, significance of changes to web pages (such as 50% or more content change and/or high priority page changes and the like), time-of-day permissions, and/or general time permissions set by the distributed resources control component 414 and the like. The notification component 412 can also utilize an algorithm to determine its own significance factors and/or its own timing schedule for data transfers. One skilled in the art will appreciate that the functionality of the notification component 412 can reside within a client control component 408 and/or other client system components not illustrated in FIG. 4.

In order to fully comprehend the present invention, operational examples are described. In one instance of the present invention, a distributed client-based crawler operates as follows. A server is assumed to exist that receives incoming client messages about potential new web pages and content/status changes for web pages, as well as a set of clients that communicate with the server. The client machines can either be personal computers that are used for web-browsing or a proxy-server which is used to serve pages to a personal computer. The clients are instrumented to gather information on web pages that are viewed which can include, but are not limited to, (1) a URL used to reach a web page (2) a hash of contents of the web page (3) contents of the web page (4) and time of visit. In some instances of the present invention (e.g., proxy-server and the like), it might be impractical to persist all of this information and some information might only be persisted for some period of time.

In another instance of the present invention, a client records URLs of web pages visited from a particular browser or proxy server for a particular period of time, and then sends this set of URLs to a server. The server then checks which URLs were previously unknown to it, and adds these to a known-URL list for future crawling/downloading/indexing. This allows a search engine associated with the server to learn about web pages that might not have been found by a topological crawl.

In order to decrease the volume of information sent from clients to a server, a client can keep information locally as to whether it has already informed the server of a particular URL, and only send information to the server if it has not already done so. There are well known methods for efficiently determining if two web pages are identical by mapping each document to an integer via a hash function and then checking whether the two hash values are identical. If a most recent hash for content associated with a URL is different than a previous hash of the content associated with the URL then the content has changed. Every time a client visits a web page, it computes a hash value for that page. If the client has previously visited the page, it checks whether the hash value has changed. If so, the client has determined that the web page has changed since the client last accessed it and can inform a server. The client records the new <url, hash value> pair locally.

There are a number of different ways a client can inform a server about a change. The simplest is just to send a message that a URL content/status has changed. Then the server can schedule to recrawl that page as soon as possible. To circumvent a server needing to revisit a page, a client can send additional information. If the client has a cached copy of the page from its last visit, it can send an old hash value, along with differences between the old and new versions, and a new hash value. The server first checks if the client's old hash value matches the server's current hash value for that page. If so, it can update the page content accordingly. Note that some document changes are more important than others. For example, in one case an entire page might change whereas in another only a single comma has been added to one sentence. The client can compute the significance of a change and either (a) utilize this information to prioritize what updates it sends to the server or (b) send the significance value to the server along with other page information so the server can use this information in prioritizing its recrawling/reindexing of the page. Examples of change significance functions include, but are not limited to, such items as percentage of document that has changed, linguistic/semantic significance of a change, and estimate of a percentage of user searches that would be affected by the change and the like. Significance can also be weighted by an estimate of the popularity of a page.

One disadvantage with the aforementioned communication means is that it results in significant traffic overhead between clients and a server. For example, if 100 clients all visit page "X" for the first time, each sends a message to a server that it has discovered page "X." Likewise, once the server has been notified that page "Y" has changed, it does not need additional clients to inform it. Thus, additional instances of the present invention are provided infra which result in a significant decrease in unneeded communication between clients and a server.

Figure 5:
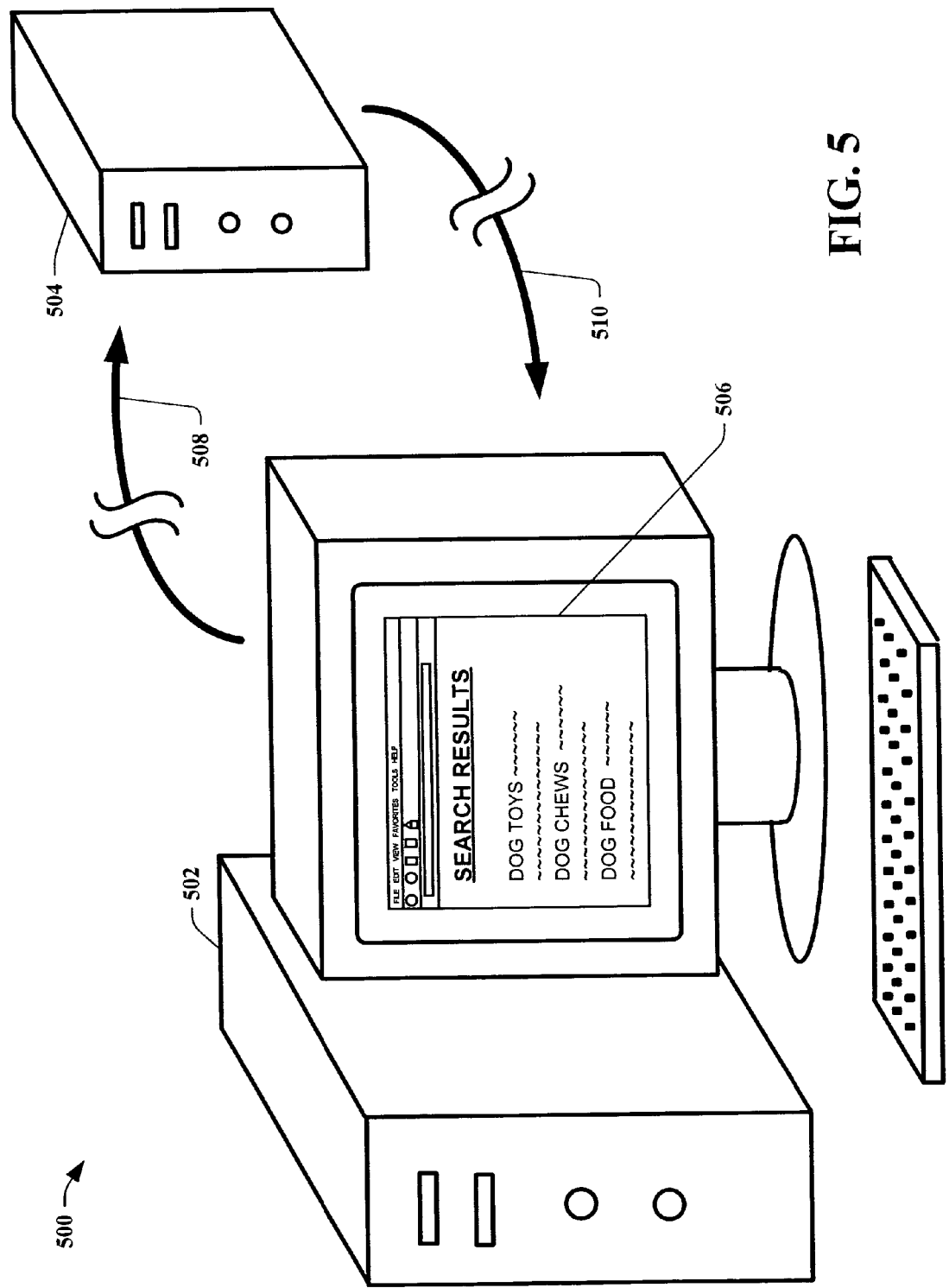
FIG. 5 is an illustration of a data analysis system utilizing search page results in accordance with an aspect of the present invention.

Referring to FIG. 5, an illustration of a data analysis system 500 utilizing search page results in accordance with an aspect of the present invention is shown. The data analysis system 500 is comprised of a client 502 with a search results page 506 and a search server 504 with a communication means for transmitting 508 and receiving 510 from the client 502 to the server 504. In a first example of an instance of the present invention, the client 502 notifies the server 504 of a changed web page, but does not send any additional information. When a user utilizes a search engine, the search server 504 provides results to clients that include a hash of a server's version of the content and a freshness flag that indicates whether the contents are known not to be fresh, for each web page in the search results page 506. If the client 502 visits one of the pages in the search results page 506, it first checks whether the server 504 already knows the page not to be fresh (e.g., another client has informed the server 504, but the server 504 has not yet refreshed the page), computes a hash of the contents of the page and compares it to the hash that the search engine provided. If they disagree, the client 502 then sends the server 504 a notification that the content associated with that URL has changed. When the server 504 receives the notification, it changes a status of the freshness flag and adds the URL to a priority queue for recrawling.

This example can be extended for a scenario where clients send page difference information to a server (which can be utilized either for the server to update its information about a web page without crawling and/or to help prioritize when the server should recrawl the web page). This can be accomplished by having a search engine send two additional fields with each search result, namely a time of last client notification and a page hash value from the last client notification. If a client visits a page returned by the search engine and either (a) a known-not-fresh flag is false or (b) a known-not-fresh flag is true AND a hash value from last client notification differs from a hash value this client computes for a page then a client notifies a server. It is also possible to recognize cycles of page changes so that if a page repeatedly changes from A to B to C to A, the present invention can recognize that and limit the client updates about this page.

In addition to decreasing the amount of unnecessary communication between clients and server, one additional benefit of "Messaging via Search Engine Results Page" is that it avoids some possible privacy concerns by assuring a client only sends information to a server about a web page the server already knows about. In this manner it is assured that the client does not, for example, visit a page that a client expects to be kept secret and inform the server about the existence of this page.

One disadvantage with the aforementioned instance of the present invention is that a server can only learn information about web pages that it returned to a client via a user search query. This requirement can be relaxed by informing a server about web pages returned to a client via any search engine. The client is instrumented to recognize that a user is utilizing any search engine. When the client visits a search result it computes a hash of the content. If the client has previously visited this URL then it will have cached a hash for the content. If these hashes differ then the client can upload the URL and new hash to the server (as a function of a time since a previous visit and other information). If the client has never visited the URL then the client can upload the URL and new hash to the server (as a function of a time since a previous visit and other information).

However, if a client had a local copy of a full list of URLs known to a server then when it encountered a potentially novel URL, it could simply check to see if it is in a list of known URLs and only send the URL to the server if it is not already in the list. Likewise, if the client had a local copy of a full list of <url, hash value> pairs for all URLs known to the server, it need only send update information if the information is new to the server. The problem with this idea is that it is infeasible to pass these entire lists to each client. For example, a search engine may know about many billions of URLs, which is many gigabytes of data. In addition to a significant bandwidth problem, it is unreasonable to expect each client to devote this large amount of local storage for such lists.

Alternatively, in another instance of the present invention, a communication means is provided that eliminates the significant bandwidth problem. For example, assume an alphabet S is given. Then S* is a set of all strings consisting of letters from S. Define a dictionary D to be a subset of strings in the set S*. An indicator function I for dictionary D, I: S*→{0,1} has a property that I(d)=1 iff d e D. A weak indicator function $I_w$ for dictionary D is a function that has a property that $I_w$(d)=0 implies d is not in D (in other words, $I_w$(d)=1 for all d e D and $I_w$(d) can be either 0 or 1 for any d not in D). Finally, define a proper set of weak indicator functions I={$I_{w1}$, $I_{w2}$, . . . , $I_{wn}$} to be a finite set of weak indicator functions that have a property that for any d not in D, there exists at least one $I_{wi}$ e I such that $I_{wi}$(d)=0.

Thus, each client receives a randomly chosen weak indictor function from I. These indicator functions are significantly smaller than an overall set of URLs, and so it is practical to send them to clients. For any URL already known by a server, an indicator function correctly determines that it is known. For URLs not known by the server, it may falsely label it as known, in which case a client does nothing, or correctly label it as unknown, in which case the client can inform the server. By definition of a proper set of weak indicator functions, it is guaranteed that any time a web site is visited by a client that is unknown to a server, there is a nonzero probability that a client's indicator function will recognize that site as new.

To further simplify the example given supra, assume S {a,b,c,d}, all strings in S* are of length less than 4, and a dictionary D={abc, adc, b, cbd, ddd}. An example of a weak indicator function for this dictionary is:

I(string)=1 iff (a second character is one of {b, d, null}).

A weak indicator function can be randomly constructed for D as follows:
(1) Randomly partition D into two non-overlapping sub-dictionaries D' and D
(2) Randomly choose a weak indicator function I for D' that consists of a conjunction of one or more terms of the form "the ith character is a member of the set S (S is a subset of S).
(3) Randomly choose a weak indicator function I" for D" in the same way.
(4) Create a function I(x)=1 iff I'(x)=1 or I"(x)=1.

A set of all such weak indicator functions produces a proper set of weak indicator functions. Client dictionaries can be extended also to the problem of detecting page recency by having a dictionary consisting of <url, page hash value> pairs.

Figure 6:
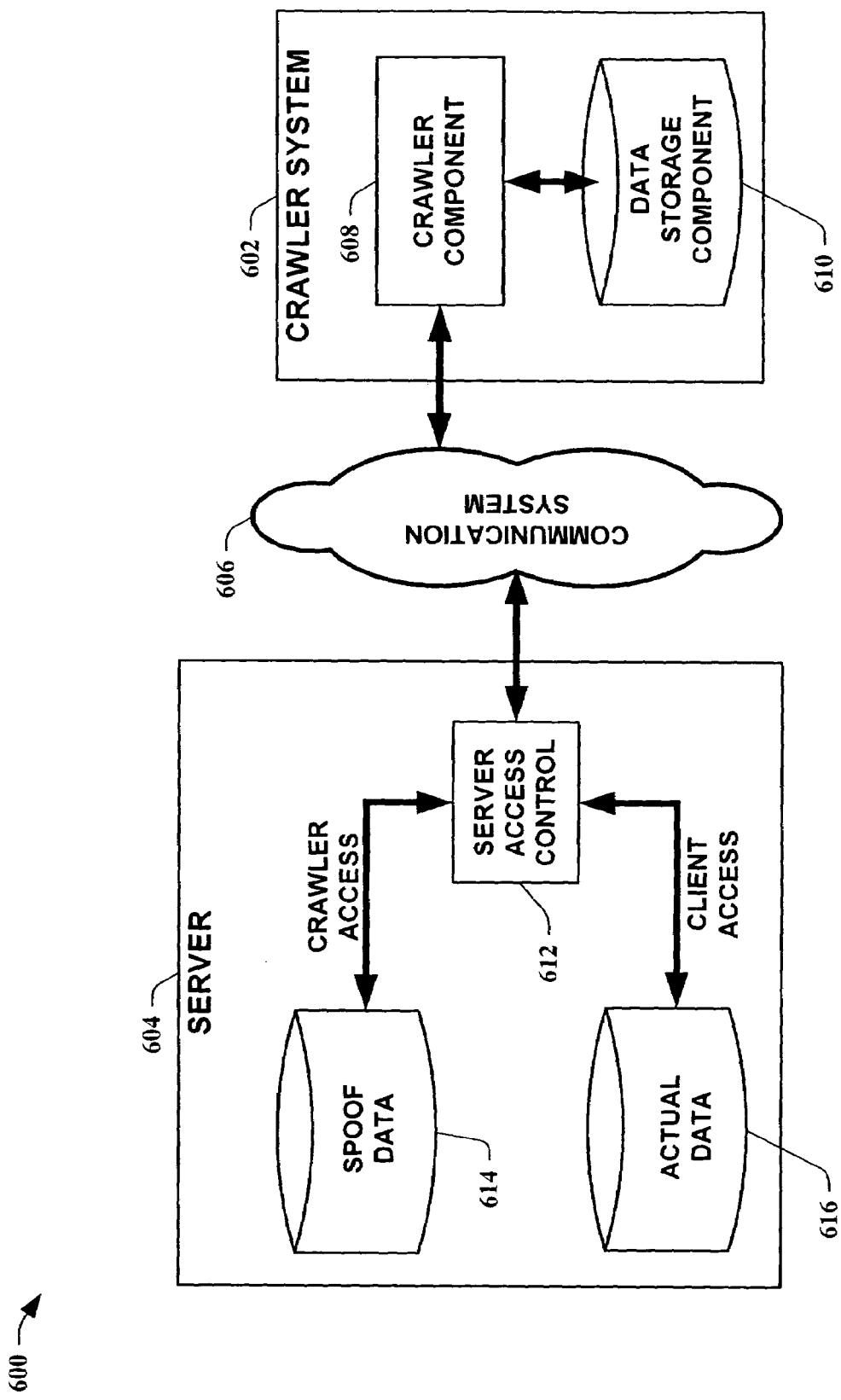
FIG. 6 is a block diagram of a spoofing process involving a web crawler system in accordance with an aspect of the present invention.

One unique aspect of the present invention is its ability to compare crawler data from a view point of a dedicated crawler and from a view point of a client. This is particularly important as the sophistication of servers increases. With "smarter" software, servers are better able to control the flow and access of data residing within it. This includes the ability to block any or all users from accessing some or all of the information found on a server. Even different types of users can be given different "permissions levels" with regard to server access and even time-of-access privileges. Generally, this increased flexibility is utilized for constructive purposes such as security, enforcing pay access, and preventing malicious hacking. However, it is often times utilized to mask the real content of web pages found on the server. In FIG. 6, a block diagram of a spoofing process 600 involving a web crawler system 602 in accordance with an aspect of the present invention is shown. The process 600 involves the web crawler system 602 and a server 604 with a communication system 606 interoperative between them. The web crawler system 602 is comprised of a crawler component 608 and a data storage component 610. The server 604 is comprised of a server access control 612, spoof data 614, and actual data 616. When the typical crawler component 608 accesses the server 604, it 608 identifies itself as a web crawler to the server 604. This is deemed being "polite." Politeness is self-policing in that a web crawler that abuses a server by ignoring server rules will generally be denied access to the server in the future. Being denied access to a server is especially critical to a search engine which relies on server access to provide content to users of a search engine. Thus, crawlers typically abide by the politeness rules. Other politeness rules include time-of-day access, server resource usage, and non-destructive retrieval of data and the like. In this example, the server access control 612 identifies the crawler component 608 and, instead of directing access to the actual data 616, it 612 directs the crawler component 608 to the spoof data 614. The spoof data typically contains the same URL information as the actual data 616 but with different content. This is usually done to mask objectionable content. As an example, the server 604 can fool a search engine into returning URLs with dog content to ardent cat lovers searching for cat toys. The server 604 compiles spoof data 614 utilizing the correct URLs but the content has been changed to cat related information. The actual data 616, however, contains dog related information. Thus, the crawler component 608 retrieves the spoof data 614 thinking that the URLs relate to cats, when in fact, they relate to dogs. The crawler component 608 then stores the spoof data 614 in the data storage component 610 which is accessible by a search engine. Thereafter, a search for cats via the search engine will also return URLs that contain dog information. The dog/cat example may seem benign, but the same technique can also be utilized to mask things such as advertising, pornography, extreme literature, subversive groups, and other subjectively offensive material and the like.

Figure 7:
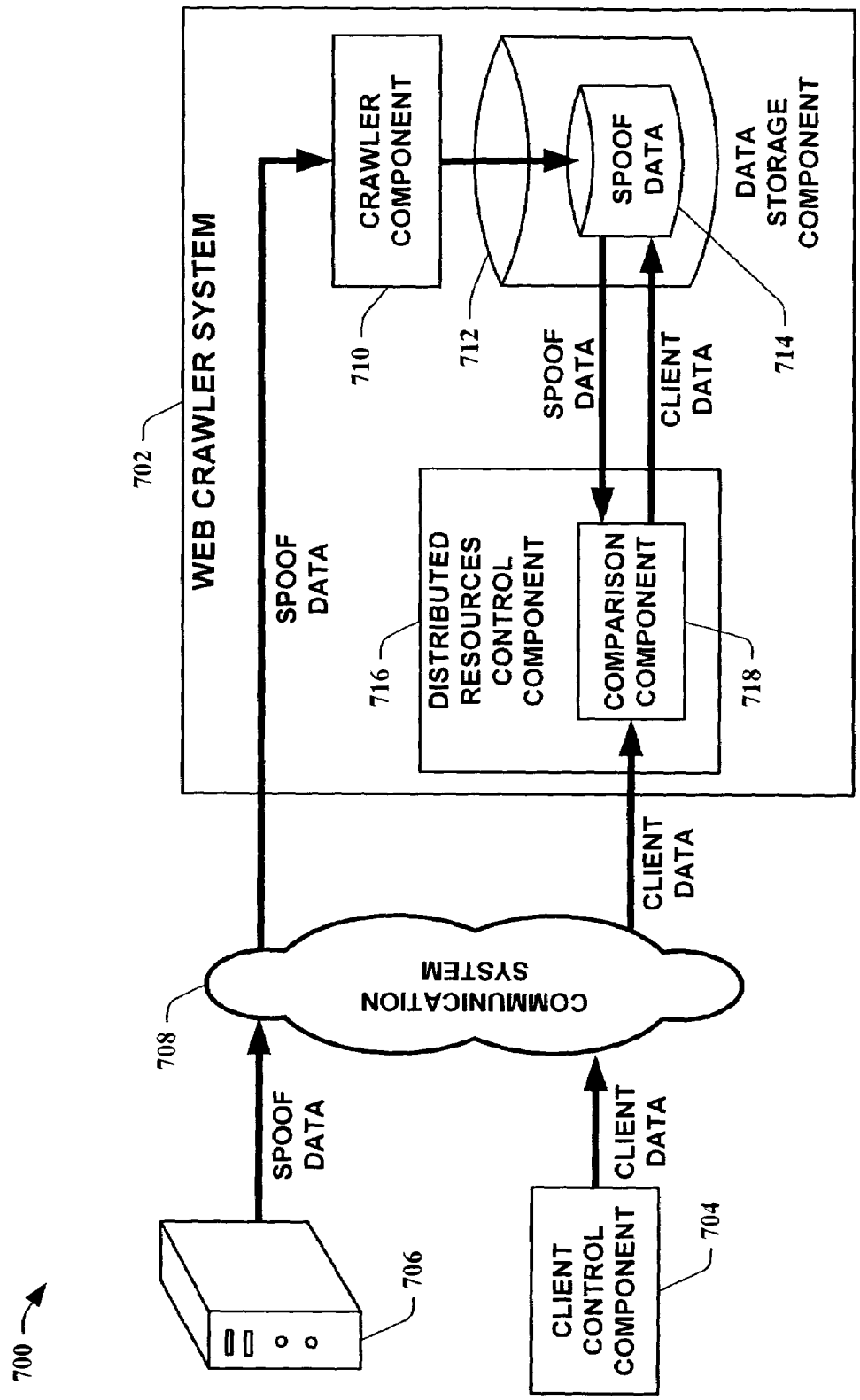
FIG. 7 is a block diagram of an anti-spoofing process involving a web crawler system in accordance with an aspect of the present invention.

In FIG. 7, a block diagram of an anti-spoofing process 700 involving a web crawler system 702 in accordance with an aspect of the present invention. The process 700 involves the web crawler system 702, a client control component 704, a web server 706, and a communication system 708 providing interconnectivity. The web crawler system 702 is comprised of a crawler component 710, a data storage component 712 with spoof data 714, and a distributed resources control component 716 with a comparison component 718. The crawler component 710 retrieves the spoof data 714 from the web server 706 as illustrated and described for FIG. 6. The spoof data 714 is then stored in the data storage component 712. At this point, a typical search engine (not illustrated in FIG. 7) accesses the spoof data 714 and disseminates it to users of the search engine unbeknownst of its true contents. However, by utilizing the present invention, the spoof data 714 can be eliminated. This is achievable due to the fact that although a server spoofs crawlers, it typically does not spoof users accessing its web pages. Since the present invention employs distributed resources such as the client control component 704, it 704 can access the server 706 as a user and retrieve actual data from the server 706. The client control component 704 can then forward the actual data (or "client data") and/or a representation of the actual data, to the distributed resources control component 716. The comparison component 718 within the distributed resources control component 716 can then retrieve the stored spoof data 714 and compare it to the actual data received from a client. If the data is different, the distributed resources control component 716 can overwrite the spoof data 714 residing in the data storage component 712, eliminating this inaccuracy. This permits a search engine to access accurate data that otherwise would not be available to it.

In view of the exemplary systems shown and described above, methodologies that may be implemented in accordance with the present invention will be better appreciated with reference to the flow charts of FIGS. 8-12. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 8:
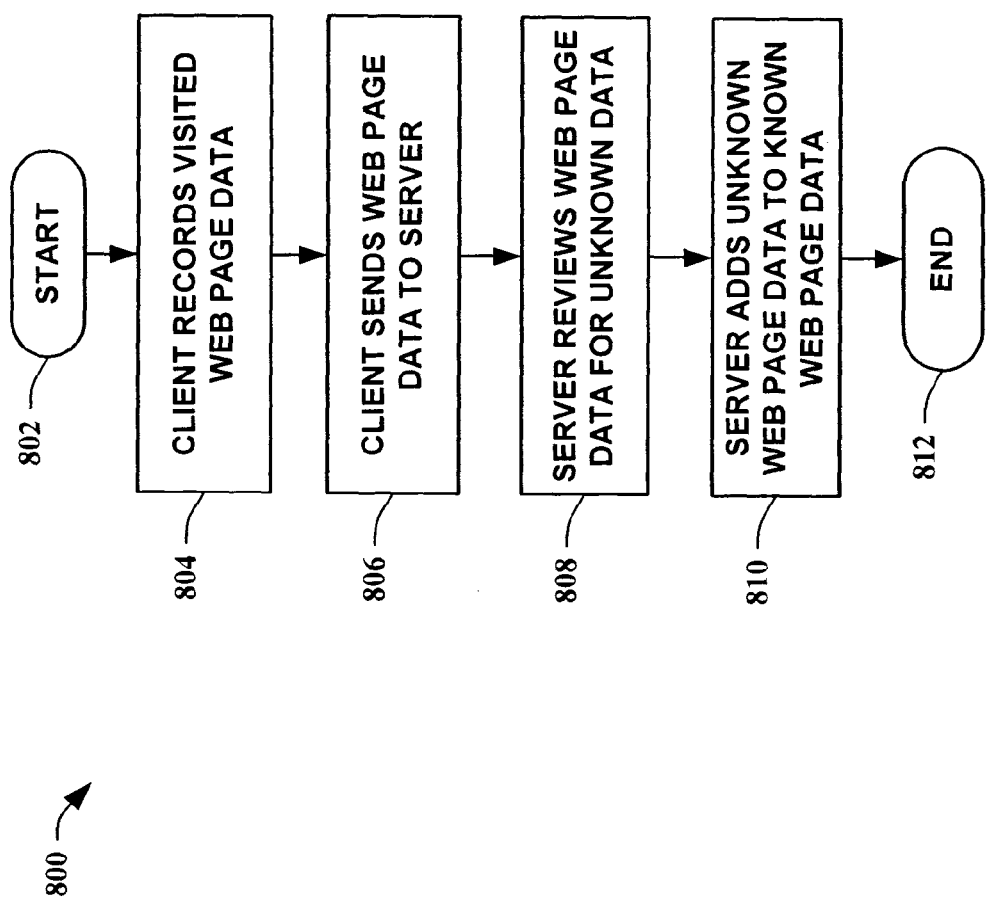
FIG. 8 is a flow diagram of a method of client-based web crawling in accordance with an aspect of the present invention.

Referring to FIG. 8, a flow diagram of a method 800 of client-based web crawling in accordance with an aspect of the present invention is illustrated. The method 800 starts 802 by a client recording web page information obtained while visiting web pages 804. In a simple instance of the present invention, the information contains only URLs of the visited web pages. More complex instances of the present invention can include, for example, URL, hash data of the web page's contents, and time stamps and the like. The client then sends the web page information to a server 806. It is also possible, in an instance of the present invention, for the client to inform other clients of the web page information. Again, in a simple instance, the information can include only URLs, or in a complex instance, the information can include several different types of data about the web pages. In one instance of the present invention, the client generates additional information derived from the web page information. This data can include, for example, time periods that a web page is accessible, ease of accessing (overloading, retries to connect, etc.), and embedded link status and the like. Additionally, the web page information can be scheduled, to control when the information is sent. The scheduling can be instigated by the client and/or by the server. Criteria for sending the information can include, but is not limited to, time of day, length of time, date, amount of data gathered, and type of data gathered (e.g., unknown data v. known data, spoof data discovered, etc.) and the like. In order to decrease the volume of information sent from clients to the server, a client, in one instance of the present invention, can keep information locally as to whether it has already informed the server of a particular URL, and only send information to the server if it has not already done so. When the server receives the web page information, it reviews the information to determine if there is any new data relative to data it has already accumulated 808. In a simple instance of the present invention, this includes determining if any URLs are new compared to the accumulated list of URLs already on the server. When unknown information has been found, the server adds the unknown information to its accumulated or "known" data 810, ending the flow 812. The known data, in one instance of the present invention, is a URL list that is employed for future web crawling, downloading, and/or indexing and the like by the server.

Figure 9:
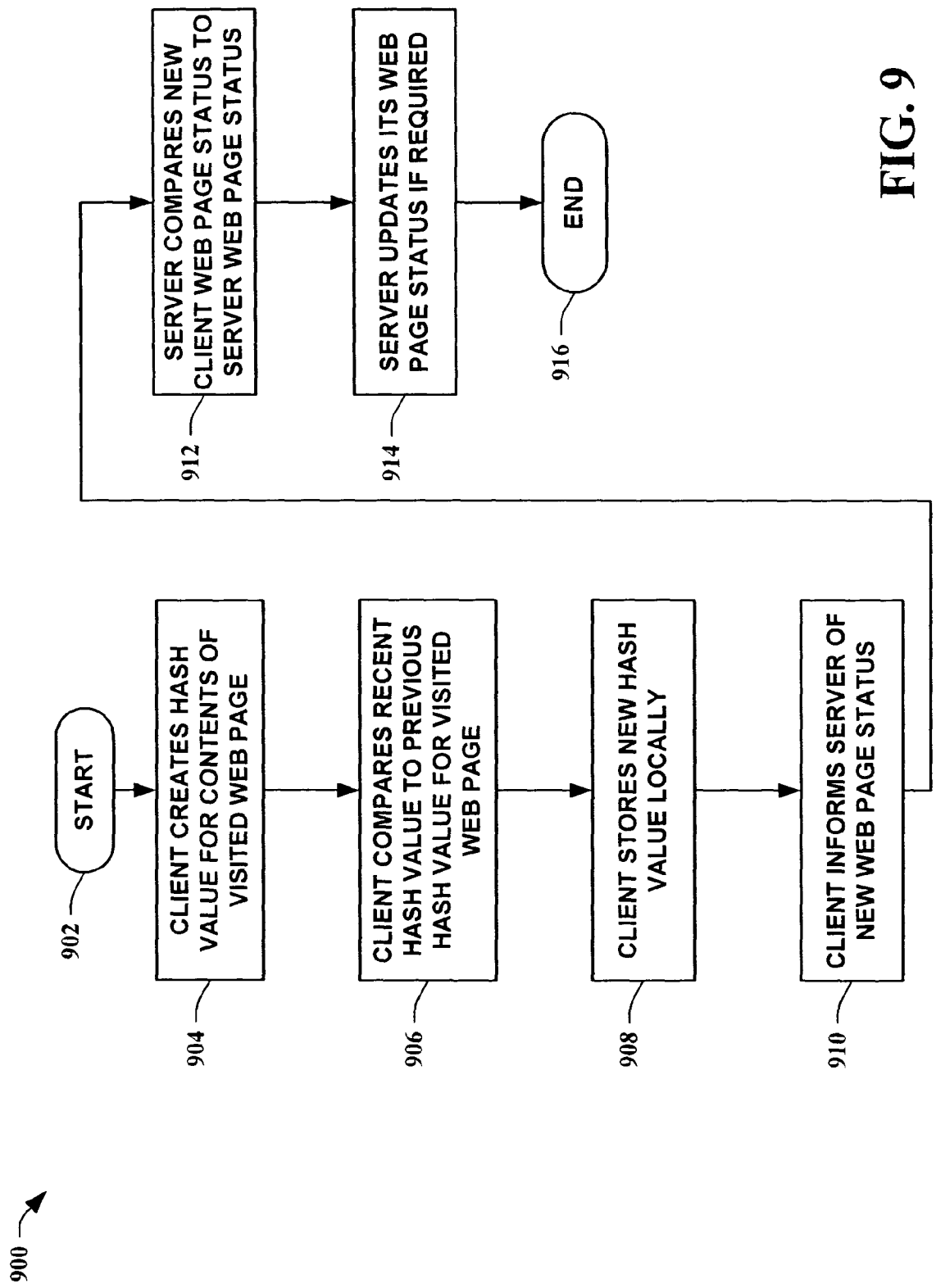
FIG. 9 is another flow diagram of a method of client-based web crawling in accordance with an aspect of the present invention.

Turning to FIG. 9, another flow diagram of a method 900 of client-based web crawling in accordance with an aspect of the present invention is shown. The method 900 starts by a client computing a hash value for contents of a web page it has visited 904. When the client has visited the web page more than once, a previous hash value has been computed and stored for that web page. The client then compares the just computed or "recent" hash value to the previous hash value for the web page 906. The client in doing the compare can establish a significance of differences found. For example, in one case an entire web page might have changed whereas in another case only a single comma has been added to a sentence. The client can compute the significance of a change and either (a) use this information to prioritize what updates it sends to a server and/or (b) send the significance value to the server along with other web page information so the server can use this information in prioritizing its recrawling/reindexing of the page. Examples of change significance can include, but are not limited to, percentage of document that has changed, linguistic/semantic significance of a change, and estimate of a percentage of user searches that are affected by a change and the like. Significance can also be weighted by an estimate of the popularity of a page. Typically, the client stores web page status information locally and updates this stored information when necessary 908. The client then informs a server about the web page status information 910. It is also possible, in an instance of the present invention, for the client to inform other clients of the web page status information. The manner in which the server and/or client is notified can include, but is not limited to, URL only, URL plus new hash, and/or URL plus new hash and old hash and the like. The server (or other client) then compares the client web page status information, if it contains additional information besides a URL, to its own server web page status information 912. If the server only receives a URL for a web page as a status change, the server typically instigates a revisiting/crawl of that web page to gain new status information for comparison with its previous server web page status information. The server then updates its web page status information when necessary 914, ending the flow 916. To circumvent the server needing to revisit a web page, the client can send additional information. If the client has a cached copy of the page from its last visit, it can send the old hash value, along with the differences between the old and new versions, and the new hash value. The server first checks if the client's old hash value matches the server's current hash value for that page. If so, it can update the page content accordingly.

Figure 10:
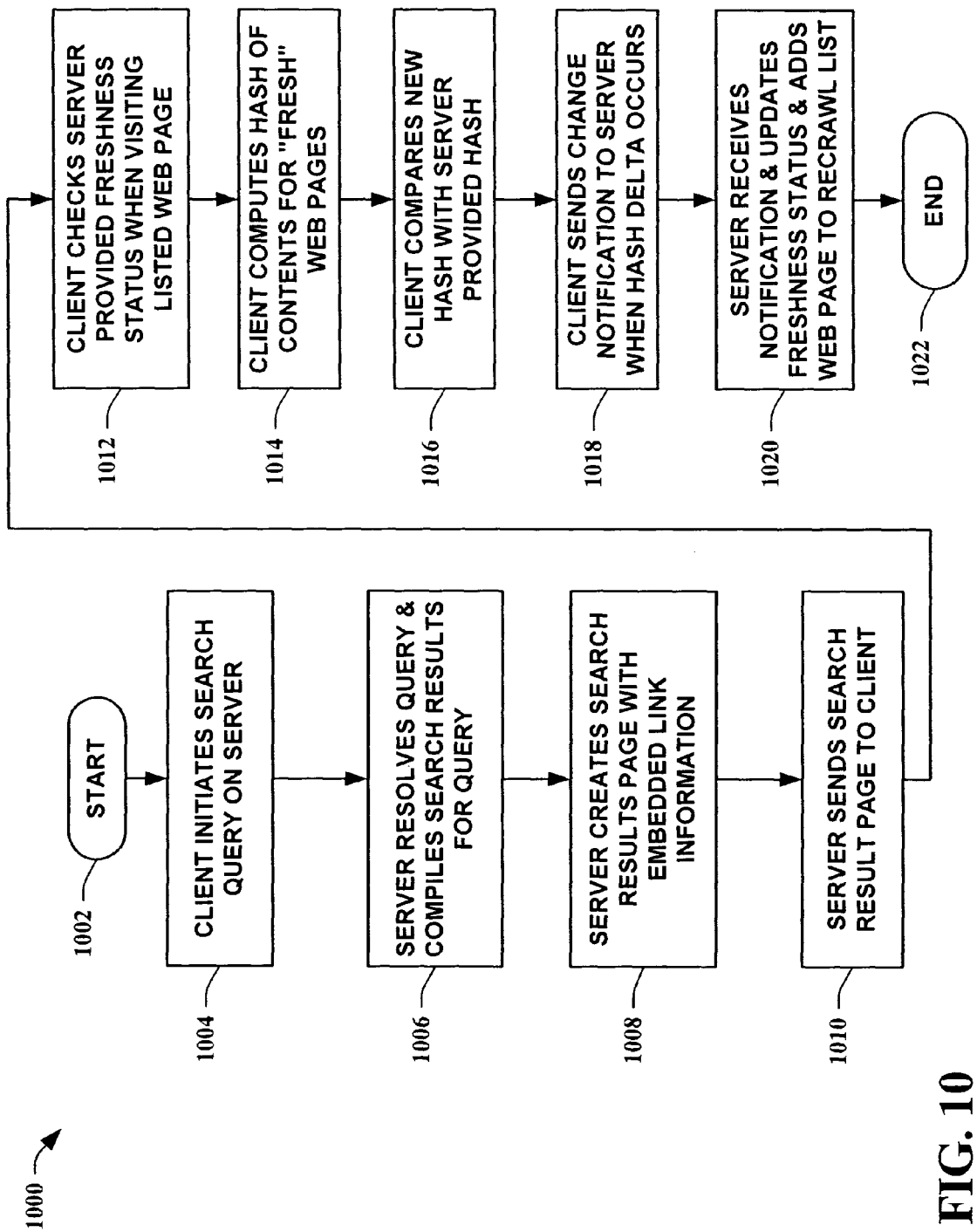
FIG. 10 is yet another flow diagram of a method of client-based web crawling in accordance with an aspect of the present invention.

In FIG. 10, yet another flow diagram of a method 1000 of client-based web crawling in accordance with an aspect of the present invention is depicted. The method 1000 starts 1002 by a client initiating a search query on a search server 1004. The search server resolves the search query and compiles a list of search results in response to the query 1006. The search server then constructs a search results page with embedded web page link information 1008. Typical information can include, but is not limited to, a hash of the server's version of a web page's content and/or a flag to indicate whether contents are known not to be fresh for each web page (e.g., another client has informed the search server with a new update for the web page, but the search server has not yet refreshed the web page). Thus, a web page with a "known not to be fresh" flag is a web page that the search server does not want the client requesting the search to send update information about. The search server then sends the search results page with embedded links to the client that requested the search 1010. As the client visits web pages that are listed on the search results page, it checks the embedded freshness flag (or freshness status) provided by the search server 1012. The client computes a hash of the contents of a web page it visits when the freshness status is "fresh" 1014. A fresh status indicates that the search server believes it possesses the latest or freshest version of a web page. Thus, the client computes a new hash of the contents of the web page and compares it to an embedded hash provided by the search server 1016. The client then notifies the search server whenever a difference or delta is found between the new hash and the search server provided hash 1018. The search server then receives the notification and updates the freshness status to "known not to be fresh" and also adds the web page to a list for recrawling 1020, ending the flow 1022. The recrawling list, in this instance of the present invention, is the method the search server utilizes to update its hash of the contents of a listed web page with a "known not to be fresh" status. The search server "recrawls" or re-visits the web page in order to complete the update.

In another instance, the supra method is extended to construct a method where clients send page difference information to a search server (which is then utilized either for the search server to update its information about a web page without crawling and/or to facilitate prioritization when the search server should recrawl a web page) by having the search server send additional fields with each search result including, but not limited to, time of last client notification and a web page hash value from the last client notification. If a client visits a page returned by the search server and either (a) a "known not to be fresh" flag is false or (b) a "known not to be fresh" is true AND a hash value from the last client notification differs from a hash value this client computes for a web page then the client notifies the search server. It is also possible to recognize cycles of page changes so that if a page repeatedly changes from A to B to C to A, it can recognize that and limit the client updates about this page.

By utilizing a search results page, traffic between a client and a server is drastically reduced in a client-based web crawler as denoted by the present invention. Additionally, client privacy is maintained due to the fact that only web pages that a server has provided in a search results page are updated by a client. In this manner, if a client visits a web page that has restricted access, this information is not inadvertently sent to a search server. The advantage of this method is also a disadvantage in that the search server cannot utilize a client to expand its known web pages for employment in searches, even if a new web page is not private.

In another instance of the present invention, a method (not illustrated) exploits not only a search server's web page information, but exploits other search server's web page information as well. Thus, a new web page returned by another search server to a client can be utilized to notify the search server that a new web page exists. This still maintains privacy for a client because it only notifies the search server of publicly available web pages that the search server does not have listed. This enables the search server to add unknown web pages without compromising the client's trust. The notification can include, but is not limited to, a URL for the web page, a hash of contents of the web page, a time stamp of web page access, and a delta of new hash compared to previous hash for the web page and the like.

Figure 11:
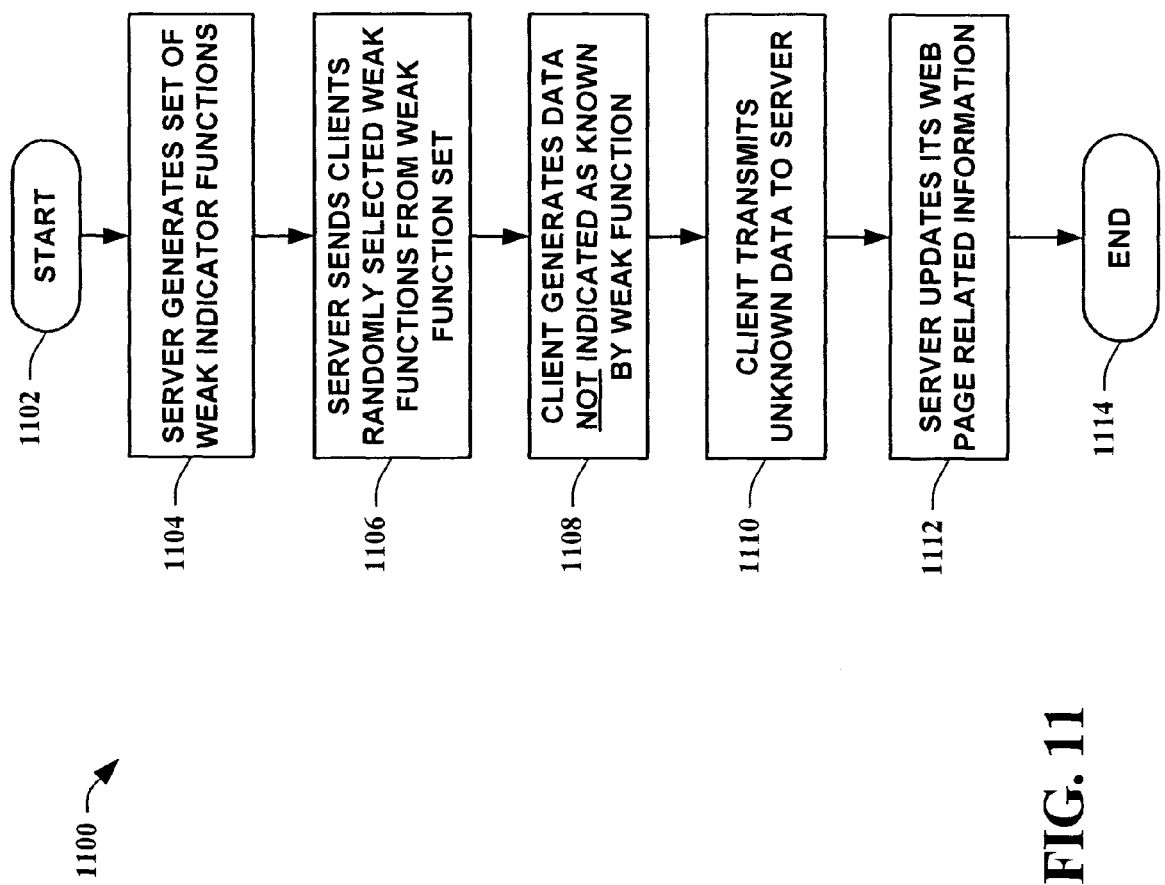
FIG. 11 is still yet another flow diagram of a method of client-based web crawling in accordance with an aspect of the present invention.

Turning to FIG. 11, still yet another flow diagram of a method 1100 of client-based web crawling in accordance with an aspect of the present invention is shown. The method 1100 starts 1102 by a search server generating a set of weak (lossy) indicator functions 1104. The method for generating these functions is discussed infra. The search server transmits randomly selected weak indicator functions to clients comprising a client-based web crawler 1106. A client then generates web page data for web pages that are indicated as not known by the randomly selected weak indicator function 1108. Generally, only the not known web pages are accurately represented by the weak indicator function. "Known" web pages may or may not be truly known. The client then transmits the unknown web page data to the server 1110. The server then utilizes this data to update its information relating to web pages 1112, ending the flow 1114.

Figure 12:
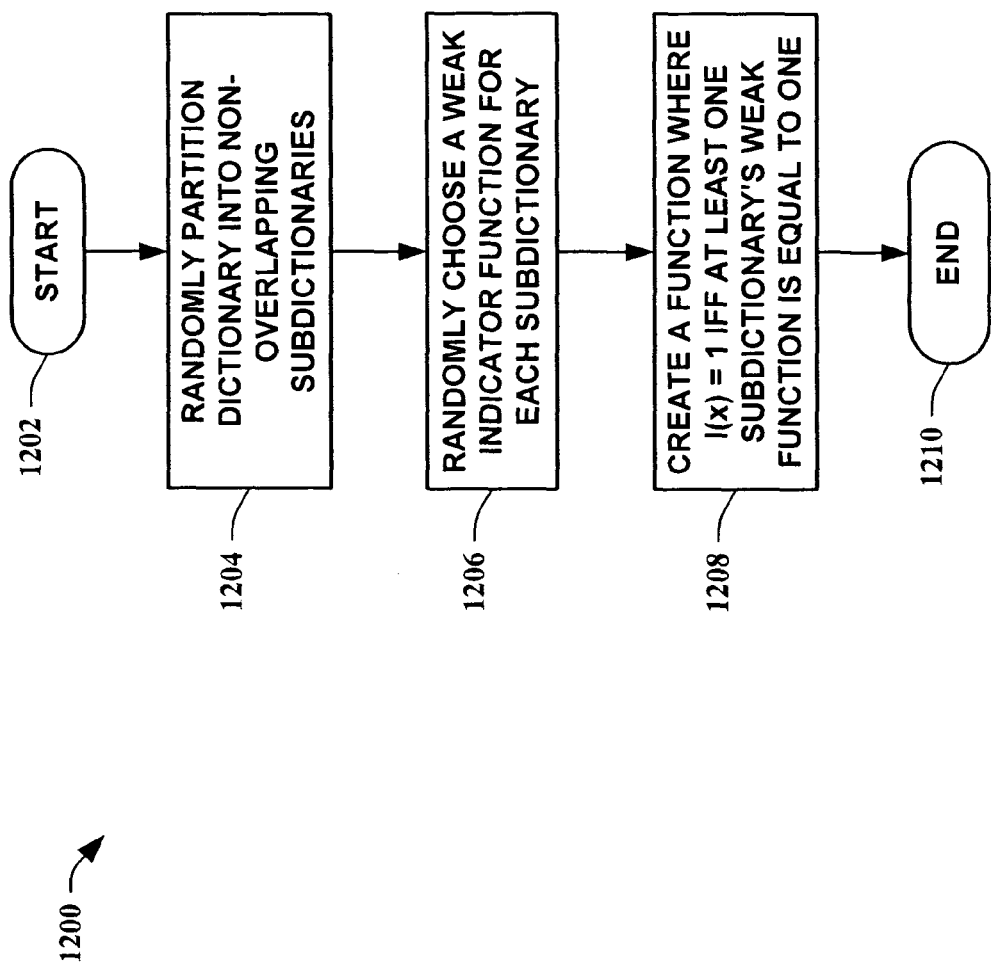
FIG. 12 is a flow diagram of a method of generating a proper set of weak indicator functions for client-based web crawling in accordance with an aspect of the present invention.

Referring to FIG. 12, a flow diagram of a method 1200 of generating a proper set of weak indicator functions for client-based web crawling in accordance with an aspect of the present invention is illustrated. The method 1200 starts 1202 by randomly partitioning a dictionary representative of web page information residing on a search server into non-overlapping subdictionaries 1204. Typically, the subdictionaries are chosen such that they each represent common traits among a grouping of web page information. A weak (lossy) indicator function is then randomly chosen for each subdictionary to represent web page information found in a particular subdictionary 1206. A function is then created such that $I(x)=1$, if and only if at least one subdictionary's weak function is equal to one 1208, ending the flow 1210. In this manner a "proper set" of weak indicator functions is generated. Thus, for example, for any URL already known by a server, the indicator function correctly determines that it is known. For URLs not known by the server, it may falsely label it as known, in which case a client does nothing, or it may correctly label it as unknown, in which case the client can inform the server. By definition, a proper set of weak indicator functions guarantees that any time a web site is visited by a client that is unknown to a server, there is a nonzero probability that the client's indicator function will recognize that site as new.

Figure 13:
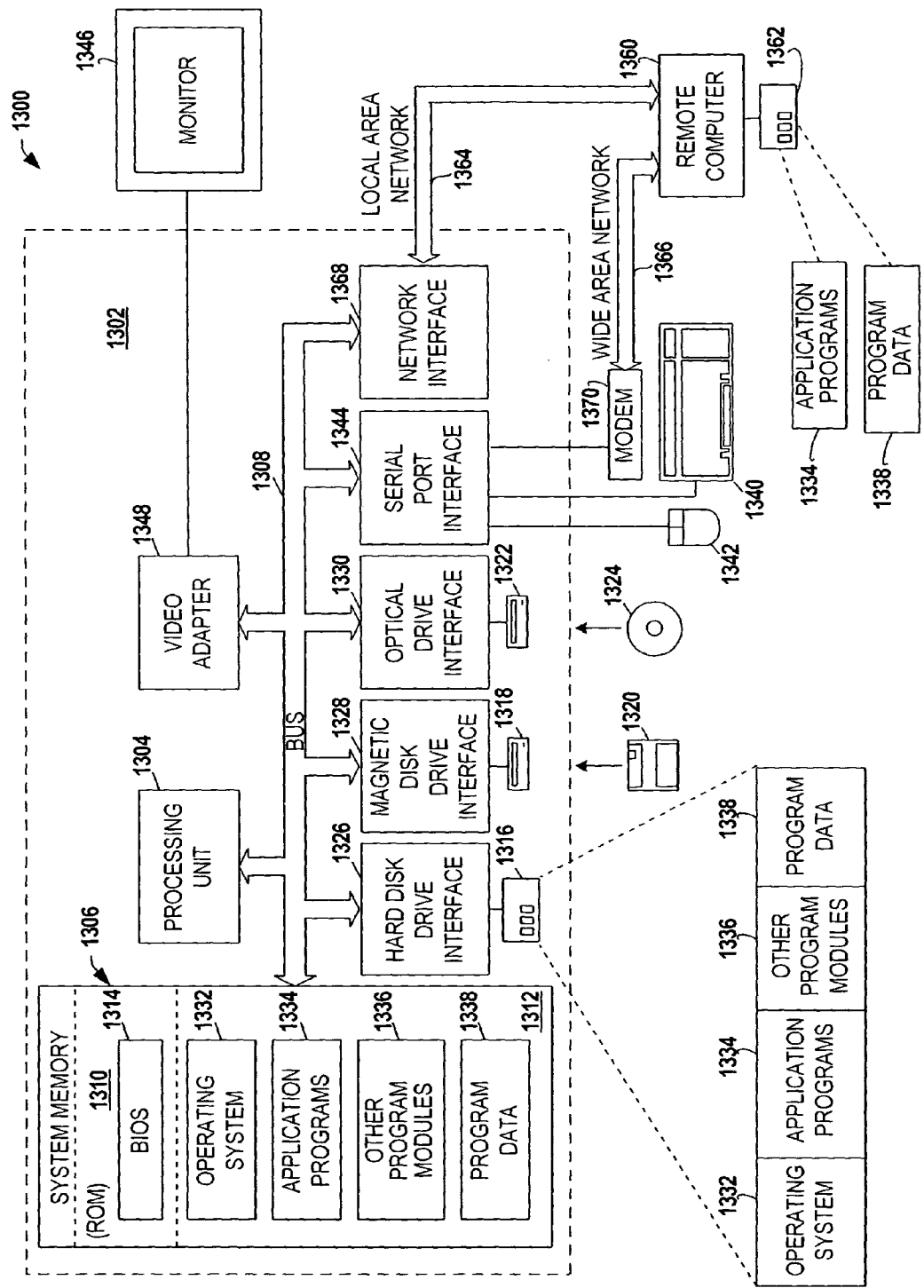
FIG. 13 illustrates an example operating environment in which the present invention can function.

In order to provide additional context for implementing various aspects of the present invention, FIG. 13 and the following discussion is intended to provide a brief, general description of a suitable computing environment 1300 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 13, an exemplary system environment 1300 for implementing the various aspects of the invention includes a conventional computer 1302, including a processing unit 1304, a system memory 1306, and a system bus 1308 that couples various system components, including the system memory, to the processing unit 1304. The processing unit 1304 may be any commercially available or proprietary processor. In addition, the processing unit may be implemented as multi-processor formed of more than one processor, such as may be connected in parallel.

The system bus 1308 may be any of several types of bus structure including a memory bus or memory controller, a peripheral bus, and a local bus using any of a variety of conventional bus architectures such as PCI, VESA, Microchannel, ISA, and EISA, to name a few. The system memory 1306 includes read only memory (ROM) 1310 and random access memory (RAM) 1312. A basic input/output system (BIOS) 1314, containing the basic routines that help to transfer information between elements within the computer 1302, such as during start-up, is stored in ROM 1310.

The computer 1302 also may include, for example, a hard disk drive 1316, a magnetic disk drive 1318, e.g., to read from or write to a removable disk 1320, and an optical disk drive 1322, e.g., for reading from or writing to a CD-ROM disk 1324 or other optical media. The hard disk drive 1316, magnetic disk drive 1318, and optical disk drive 1322 are connected to the system bus 1308 by a hard disk drive interface 1326, a magnetic disk drive interface 1328, and an optical drive interface 1330, respectively. The drives 1316-1322 and their associated computer-readable media provide nonvolatile storage of data, data structures, computer-executable instructions, etc. for the computer 1302. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1300, and further that any such media may contain computer-executable instructions for performing the methods of the present invention.

A number of program modules may be stored in the drives 1316-1322 and RAM 1312, including an operating system 1332, one or more application programs 1334, other program modules 1336, and program data 1338. The operating system 1332 may be any suitable operating system or combination of operating systems. By way of example, the application programs 1334 and program modules 1336 can include facilitating client-based web crawling in accordance with an aspect of the present invention.

A user can enter commands and information into the computer 1302 through one or more user input devices, such as a keyboard 1340 and a pointing device (e.g., a mouse 1342). Other input devices (not shown) may include a microphone, a joystick, a game pad, a satellite dish, wireless remote, a scanner, or the like. These and other input devices are often connected to the processing unit 1304 through a serial port interface 1344 that is coupled to the system bus 1308, but may be connected by other interfaces, such as a parallel port, a game port or a universal serial bus (USB). A monitor 1346 or other type of display device is also connected to the system bus 1308 via an interface, such as a video adapter 1348. In addition to the monitor 1346, the computer 1302 may include other peripheral output devices (not shown), such as speakers, printers, etc.

It is to be appreciated that the computer 1302 can operate in a networked environment using logical connections to one or more remote computers 1360. The remote computer 1360 may be a workstation, a server computer, a router, a peer device or other common network node, and typically includes many or all of the elements described relative to the computer 1302, although, for purposes of brevity, only a memory storage device 1362 is illustrated in FIG. 13. The logical connections depicted in FIG. 13 can include a local area network (LAN) 1364 and a wide area network (WAN) 1366. Such networking environments are commonplace in offices, enterprise-wide computer networks, intranets and the Internet.

When used in a LAN networking environment, for example, the computer 1302 is connected to the local network 1364 through a network interface or adapter 1368. When used in a WAN networking environment, the computer 1302 typically includes a modem (e.g., telephone, DSL, cable, etc.) 1370, or is connected to a communications server on the LAN, or has other means for establishing communications over the WAN 1366, such as the Internet. The modem 1370, which can be internal or external relative to the computer 1302, is connected to the system bus 1308 via the serial port interface 1344. In a networked environment, program modules (including application programs 1334) and/or program data 1338 can be stored in the remote memory storage device 1362. It will be appreciated that the network connections shown are exemplary and other means (e.g., wired or wireless) of establishing a communications link between the computers 1302 and 1360 can be used when carrying out an aspect of the present invention.

In accordance with the practices of persons skilled in the art of computer programming, the present invention has been described with reference to acts and symbolic representations of operations that are performed by a computer, such as the computer 1302 or remote computer 1360, unless otherwise indicated. Such acts and operations are sometimes referred to as being computer-executed. It will be appreciated that the acts and symbolically represented operations include the manipulation by the processing unit 1304 of electrical signals representing data bits which causes a resulting transformation or reduction of the electrical signal representation, and the maintenance of data bits at memory locations in the memory system (including the system memory 1306, hard drive 1316, floppy disks 1320, CD-ROM 1324, and remote memory 1362) to thereby reconfigure or otherwise alter the computer system's operation, as well as other processing of signals. The memory locations where such data bits are maintained are physical locations that have particular electrical, magnetic, or optical properties corresponding to the data bits.

Figure 14:
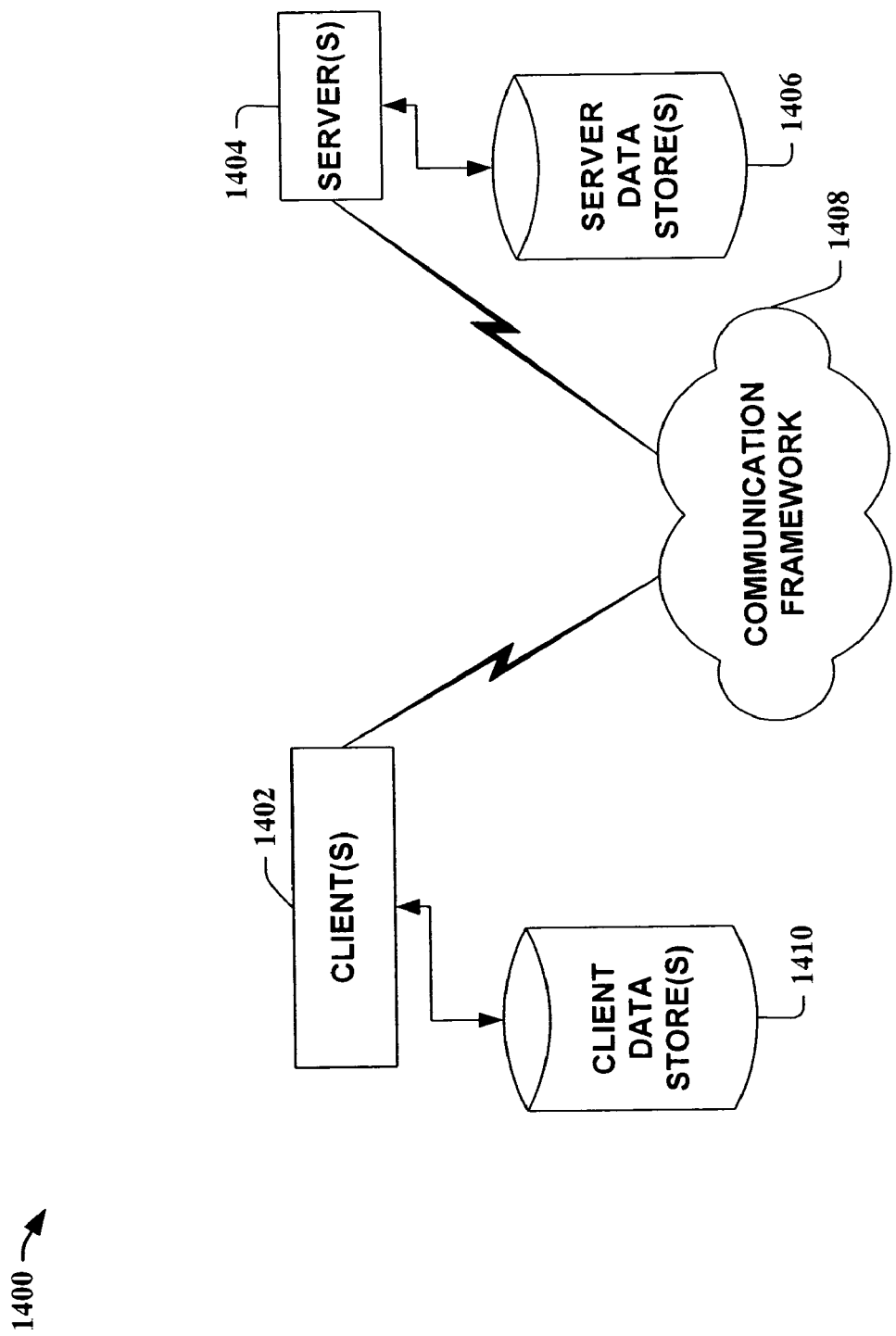
FIG. 14 illustrates another example operating environment in which the present invention can function.

FIG. 14 is another block diagram of a sample computing environment 1400 with which the present invention can interact. The system 1400 further illustrates a system that includes one or more client(s) 1402. The client(s) 1402 can be hardware and/or software (e.g., threads, processes, computing devices). The system 1400 also includes one or more server(s)

1404. The server(s) 1404 can also be hardware and/or software (e.g., threads, processes, computing devices). The servers 1404 can house threads to perform transformations by employing the present invention, for example. One possible communication between a client 1402 and a server 1404 may be in the form of a data packet adapted to be transmitted between two or more computer processes. The system 1400 includes a communication framework 1408 that can be employed to facilitate communications between the client(s) 1402 and the server(s) 1404. The client(s) 1402 are operably connected to one or more client data store(s) 1410 that can be employed to store information local to the client(s) 1402. Similarly, the server(s) 1404 are operably connected to one or more server data store(s) 1406 that can be employed to store information local to the servers 1404.

In one instance of the present invention, a data packet transmitted between two or more computer components that facilitate web crawling, the data packet is comprised of, at least in part, information relating to web crawling that utilizes, at least in part, a distributed system for web crawling.

In another instance of the present invention, a computer readable medium storing computer executable components of a system for facilitating web crawling is comprised of, at least in part, a web crawling system that determines, at least in part, information pertaining to web pages compiled by a distributed system for web crawling.

It is to be appreciated that the systems and/or methods of the present invention can be utilized in web crawling systems facilitating computer components and non-computer related components alike. Further, those skilled in the art will recognize that the systems and/or methods of the present invention are employable in a vast array of electronic related technologies, including, but not limited to, computers, servers and/or handheld electronic devices and the like which can be wired and/or wireless and the like.

One skilled in the art will also appreciate that the present invention can be utilized not only for server to client based crawling systems but also for peer-to-peer crawling systems. It is also possible that a client can perform tasking typically associated with "server" behavior and thus transfer some characteristics associated with the server to the client in some instances of the present invention. An example of one instance of the present invention is a client that performs "sub-crawls" to other clients to ascertain and/or retrieve information to send to a server. This instance can be beneficial, for example, in networks that have bottlenecks between certain clients and a server. Data can be transferred to a client with the best access to the server. In other instances of the present invention, a client can exhibit server behavior by initiating sub-crawls in an intranet system, thus reporting out information to a server from only a single and/or substantially reduced number of clients present on the intranet. In this manner a search server can initiate multiple sub-crawls in clients to expand its crawling resources.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data analysis system, comprising:
   a first component associated with a server of the data analysis system that facilitates generation of a first data set related to web page information obtained via a communication system; and
   a second component that coordinates a second data set relating to web page information from at least one distributed resource associated with at least a client of the server which interacts with the communication system; the second data set is utilized to refine the first data set, wherein refining the first data set comprises adding unknown information to the first data set when new information is received from the distributed source via the second data set or updating existing information in the first data set when changes have occurred in the contents of the web page information as indicated by the second data set.

2. The system of claim 1, the first component comprising an internet web crawler.

3. The system of claim 1, the first component comprising an intranet web crawler.

4. The system of claim 1, the second component further utilized to optimize reception of data from the distributed resources.

5. The system of claim 1, the second component provides a scheduling function to control reception of the second data set from the at least one distributed resource.

6. The system of claim 1, the second component utilized to facilitate communication traffic reduction via the communication system by employing a proper set of weak indicator functions representative of the first data set.

7. The system of claim 6, the second component further utilized to randomly select and transmit a weak indicator function selected from the proper set of weak indicator functions to at least one of the distributed resources.

8. The system of claim 1, the second component further utilized to compare the first data set and the second data set to detect spoof data retrieved by the first component.

9. The system of claim 1, the second component further utilized to generate status information about data related to the first data set; the status information transmitted to at least one distributed resource.

10. The system of claim 9, the status information comprising, at least in part, a freshness flag to indicate freshness of information related to the first data set.

11. The system of claim 9, the status information comprising, at least in part, a hash of contents of information related to the first data set.

12. The system of claim 9, the status information comprising, at least in part, a copy of information of the first data set.

13. The system of claim 1, the communication system comprising an internet.

14. The system of claim 1, the communication system comprising a world wide web.

15. The system of claim 1, the communication system comprising an internet.

16. The system of claim 15, the intranet comprising a local area network.

17. The system of claim 15, the intranet comprising a wide area network.

18. The system of claim 1, the distributed resources comprising trusted entities interactive with the communication system and the second component.

19. The system of claim 1, the first data set comprising internet web page data.

20. The system of claim 1, the first data set comprising intranet web page data.

21. The system of claim 1, the second data set comprising, at least in part, a hash of contents of at least one web page.

22. The system of claim 1, the second data set comprising, at least in part, a Uniform Resource Locator (URL) of at least one web page.

23. The system of claim 1, the second data set comprising, at least in part, a time stamp relating to an acquisition time for information about at least one web page.

24. The system of claim 1, the second data set comprising, at least in part, a delta indication of the changes to contents of the at least one web page.

25. The system of claim 24, the delta indication including, at least in part, a hash of previous contents of a web page and a hash of recent contents of the web page.

26. The system of claim 1, the second data set comprising, at least in part, a status indication of changes to contents of at least one web page.

27. The system of claim 26, the status indication including, at least in part, a percentage relating to an amount of change of contents of a web page.

28. The system of claim 26, the status indication including, at least in part, a significance indicator to signify importance of changes in contents of a web page.

29. The system of claim 1, the second data set comprising internet web page data.

30. The system of claim 1, the second data set comprising intranet web page data.

31. The system of claim 1, the second data set comprising data compiled utilizing at least one weak indicator function randomly selected from a set of weak indicator functions; the set of weak indicator functions representative of the first data set.

32. The system of claim 1, further comprising a search component to accept at least one search query and generate at least one search reply having at least a portion of the first data set represented by information embedded in the search reply.

33. The system of claim 1, further comprising a web page server component to construct web pages having at least a portion of the first data set represented by information embedded in at least one link found on at least one constructed web page.

34. The system of claim 1, further comprising a storage component to store the first data set.

35. A method for facilitating data analysis, comprising:
generating a first data set relating to a second data set obtained from web pages interactive with a server of a communication system;
receiving a third data set from at least one distributed resource comprising a client of the server that is interactive with the communication system; the third data set comprising web page related information generated by the distributed resource; and
refining the second data set to reflect information obtained from the third data set, by:
adding unknown information to the second data set when new information is received from the distributed source via the third data set;
updating existing information in the second data set when changes have occurred as indicated by the third data set; and
passing status information to the distributed resource through one or more indicators after information from the third data set has been analyzed.

36. The method of claim 35, the first data set comprising a representation of the second data set.

37. The method of claim 36, the representation of the second data set comprising, at least in part, a hash of contents of at least one web page contained in the second data set.

38. The method of claim 36, the representation of the second data set comprising, at least in part, a status indication of at least one web page contained in the second data set.

39. The method of claim 38, the status indication comprising a freshness flag to indicate if the web page information is current.

40. The method of claim 35, the first data set comprising a copy of the second data set.

41. The method of claim 35, the second data set comprising web page information compiled by a web crawler.

42. The method of claim 35, the third data set comprising web page information based upon client accessed web page information on the communication system.

43. The method of claim 35, the communication system comprising an internet.

44. The method of claim 35, the communication system comprising an internet.

45. The method of claim 35, further including:
transmitting the first data set to at least one distributed resource that is interactive with the communication system making the first data set available to be utilized by the distributed resource to generate the third data set.

46. The method of claim 36, further including:
generating a set of weak indicator functions to represent the second data set; and selecting random weak indicator functions from the set of weak indicator functions to transmit to the distributed resources as the first data set.

47. The method of claim 46, the set of weak indicator functions comprising a proper set of weak indicator functions such that a non-zero probability exists that a randomly selected weak indicator function can identify a new web page.

48. The method of claim 46, generating a set of weak indicator functions comprising:
providing a dictionary representative of the second data set;
partitioning randomly the dictionary into non-overlapping subdictionaries; and
creating a function where I(x)=1 if and only if at least one subdictionary's weak indicator function is equal to one.

49. The method of claim 35, further including:
comparing the third data set to the second data set to reveal spoof data included in the second data set.

50. The method of claim 35, further including:
optimizing reception of at least one third data set through scheduling of the distributed resources.

51. The method of claim 35, further including:
receiving a web page search query from at least one distributed resource;
generating a web search results page in response to the web page search query from the distributed resource;
embedding portions of the first data set in links found on the web search results page; and
transmitting the web search results page as a representation of at least a portion of the second data set to the distributed resource.

52. The method of claim 35, further including:
constructing a web page utilizing at least a portion of the first data set to embed information about links found in the web page; and
transmitting the web page to disseminate the first data set to at least one distributed resource.

53. A data analysis system, comprising:
  means for generating at least one first data set from a server of communication system;
  means for receiving and coordinating at least one second data set from at least one client which interacts with the server of the communication system; and
  means for refining the first data set utilizing at least one second data set, wherein refining the first data set comprises the at least one of adding unknown information to the first data set when new information is received from the client via the second data set and updating existing information in the first data set when changes have occurred in the web page as indicated by the second data set.

54. The system of claim 53, the means for generating at least one first data set including a web crawler.

55. The system of claim 54, the first data set comprising data relating to web pages obtained by the web crawler.

56. The system of claim 53, the second data set comprising web page comparison data compiled by the at least one client and based, at least in part, upon representative data of the first data set.

57. A data analysis system, comprising:
  a first component associated with at least one client of a distributed web crawling system that generates web page information from at least one visited web site for utilization in the distributed web crawling system; and
  a second component associated with a server that receives the web page information transmitted by the first component via a communication system, wherein the first component receives a set of data from the second component to utilize in the generation of the web page information comprising at least comparison data based on the visited web page and the received set of data.

58. The system of claim 57, the first component providing at least one time stamp relevant to a time of acquisition of data utilized in the generation of the web page information.

59. The system of claim 57, the first component receiving a set of embedded web crawler data from at least one search result page to utilize in the generation of the web page information.

60. The system of claim 57, the first component receiving a set of embedded web crawler data from at least one web page to utilize in the generation of the web page information.

61. The system of claim 57, the first component further operational to obtain web page data indirectly via at least one other client of the distributed crawler system to provide a gateway to the second component to substantially reduce traffic flow to the second component.

62. The system of claim 57, the generated web page information comprising, at least in part, a status indication of changes to contents of at least one web page.

63. The system of claim 62, the status indication including, at least in part, a percentage relating to an amount of change of contents of a web page.

64. The system of claim 62, the status indication including, at least in part, a significance indicator to signify importance of changes in contents of a web page.

65. The system of claim 57, at least a portion of the generated web page information made available for peer-to-peer client transmission via the communication system.

66. The system of claim 57, the generated web page information compiled utilizing a randomly selected weak indicator function from a proper set of weak indicator functions that represent web page data compiled by a web crawler.

67. The system of claim 57, the communication system comprising an internet.

68. The system of claim 57, the communication system comprising an internet.

69. The system of claim 57, further comprising a storage component to store the web page information.

70. The system of claim 57, further comprising a notification component that determines when and if the generated web page information is to be communicated via the communication system.

71. The system of claim 70, the notification component receiving scheduling information from the second component; the scheduling information relating to obtaining and transmitting the generated web page information.

72. The system of claim 57, the first component making the comparison data discretionarily available to the second component via the communication system.

73. The system of claim 57, the comparison data including, at least in part, at least one Uniform Resource Locator (URL) of at least one web page.

74. The system of claim 57, the comparison data including, at least in part, a hash of contents of at least one web page representative of a recent web site visit.

75. The system of claim 57, the comparison data including, at least in part, a delta indication of contents of at least one web page.

76. The system of claim 75, the delta indication including, at least in part, a hash of previous contents of a web page and a hash of recent contents of the web page.

77. The system of claim 57, the second component comprising a server of the distributed crawling system.

78. The system of claim 57, the second component comprising a client of the distributed crawling system.

79. The system of claim 57, the generated web page information comprising data unknown to the second component.

80. The system of claim 57, at least a portion of the received set of data made available for peer-to-peer client transmission via the communication system.

81. The system of claim 57, the received set of data comprising a dictionary for data compiled by a web crawler.

82. The system of claim 57, the received set of data comprising a representation of data compiled by a web crawler; the representation of
  data generated by utilizing a weak indicator function.

83. The system of claim 57, the received set of data comprising a copy of data compiled by a web crawler.

84. The system of claim 57, further comprising a storage component to store the set of data received from the second component.

85. A method for facilitating data analysis, comprising:
  compiling a first data set derived from accessing web pages via a client of a communication system;
  transmitting, selectively, the first data set to an entity comprising at least a server of a distributed crawling system that is interactive with the communication system;
  receiving a representation of a second data set compiled by the server of the web crawler; the second data set relating to at least one web page from the communication system; and
  utilizing the second data set to control which web pages to visit to compile the first data set.

86. The method of claim 85, the first data set comprising, at least in part, a uniform resource locator (URL) for at least one web page.

87. The method of claim 85, the first data set comprising, at least in part, a hash of contents of at least one web page.

88. The method of claim 85, selectively transmitting based upon time of day.

89. The method of claim 85, selectively transmitting based upon priority of at least one web page.

90. The method of claim 85, selectively transmitting based upon percentage of content change of at least one web page.

91. The method of claim 85, selectively transmitting based upon identifying at least one new web page.

92. The method of claim 85, receiving the representation of the second data set is accomplished via reception of a web page with embedded information derived from the second data set and generated by a web page hosting server with access to the second data set.

93. The method of claim 85, receiving the representation of the second data set is accomplished via reception of a search results page with embedded information derived from the second data set and generated in response to a query transmitted to a search server having access to the second data set.

94. The method of claim 85, further comprising:
determining when to transmit the first data set via the communication system based upon the second data set.

95. The method of claim 94, the second data set containing a freshness indicator to indicate when its data is stale and requires updating via the first data set.

96. The method of claim 94, the second data set containing a schedule for when the first data set is to be transmitted.

97. The method of claim 85, further comprising:
comparing at least a portion of the second data set with at least a portion of information obtained via accessing web pages to create comparison data; and
generating a representation of the comparison data to derive the first data set.

98. The method of claim 97, the first data set comprising data unknown to the second data set.

99. The method of claim 98, the unknown data comprising only unknown data derived from at least one search results page from a search server outside of the distributed crawling system.

100. The method of claim 97, the first data set comprising content changes to web pages represented by the second data set.

101. The method of claim 97, the first data set comprising status information relating to web pages represented by the second data set.

102. A computer readable medium having stored thereon computer executable components comprising:
a first component associated with a server of the data analysis system that facilitates generation of a first data set related to web page information obtained via a communication system; and
a second component that coordinates a second data set relating to web page information from at least one distributed resource associated with at least a client of the server which interacts with the communication system;
the second data set is utilized to refine the first data set, wherein refining the first data set comprises adding unknown information to the first data set when new information is received from the distributed source via the second data set and updating existing information in the first data set when changes have occurred in the contents of the web page information as indicated by the second data set.

103. A device employing the method of claim 35 comprising at least one selected from the group consisting of a computer, a server, and a handheld electronic device.

104. A device employing the system of claim 1 comprising at least one selected from the group consisting of a computer, a server, and a handheld electronic device.

* * * * *